United States Patent
Rupavatharam et al.

(10) Patent No.: US 12,496,723 B2
(45) Date of Patent: Dec. 16, 2025

(54) SONICFINGER: LOW-COST, COMPACT, PROXIMITY AND CONTACT SENSOR FOR REACTIVE POSITIONING

(71) Applicant: SAMSUNG ELECTRONICS CO., LTD., Suwon-si (KR)

(72) Inventors: Siddharth Rupavatharam, Piscataway, NJ (US); Richard Howard, Highland Park, NJ (US); Daewon Lee, Princeton, NJ (US); Lawrence Jackel, Keyport, NJ (US); Caleb Sebastian Escobedo, Brooklyn, NY (US); Ibrahim Volkan Isler, Saint Paul, MN (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 181 days.

(21) Appl. No.: 18/239,437

(22) Filed: Aug. 29, 2023

(65) Prior Publication Data
US 2024/0100705 A1 Mar. 28, 2024

Related U.S. Application Data

(60) Provisional application No. 63/407,533, filed on Sep. 16, 2022.

(51) Int. Cl.
*B25J 9/16* (2006.01)
*B25J 15/08* (2006.01)
*G01B 17/00* (2006.01)

(52) U.S. Cl.
CPC ............ *B25J 9/1694* (2013.01); *B25J 15/08* (2013.01); *G01B 17/00* (2013.01)

(58) Field of Classification Search
CPC ........ B25J 9/1694; B25J 15/08; B25J 13/082; B25J 13/084; B25J 13/086; B25J 9/1612; B25J 9/1628; B25J 9/163; B25J 9/1656; B25J 9/1664; B25J 9/1669; B25J 13/089; B25J 15/0009; B25J 15/0028;
(Continued)

(56) References Cited

U.S. PATENT DOCUMENTS 9,802,316 B2 10/2017 Koselka et al.
9,975,253 B2 5/2018 De Castelbajac et al.
(Continued)

*Primary Examiner* — Sze-Hon Kong
*Assistant Examiner* — Esvinder Singh
(74) *Attorney, Agent, or Firm* — Sughrue Mion, PLLC

(57) ABSTRACT

In some embodiments, an apparatus for performing reactive positioning of a robot gripper includes one or more fingers disposed on an end-effector of the robot, a signal processing circuit, a memory storing instructions, and a processor. Each of the one or more fingers includes a transducer configured to generate vibrational energy based on an input signal, and convert an acoustic reflection of the vibrational energy from an object into a voltage signal. The signal processing circuit is configured to provide the input signal to each transducer, and perform signal processing on the voltage signal of each transducer resulting in reflection data. The processor is configured to execute the instructions to perform pre-touch proximity detection on the reflection data, perform grasp positioning on the reflection data, perform contact detection from the reflection data, and provide, to the robot, results of the pre-touch proximity detection, the grasp positioning, and the contact detection.

18 Claims, 11 Drawing Sheets

(58) Field of Classification Search
CPC .................. B25J 19/026; G01B 17/00; G05B 2219/37337; G05B 2219/37412; G05B 2219/39486; G05B 2219/37393; G05B 2219/37032; G05B 2219/37044; G05B 2219/37269; G05B 2219/37351
See application file for complete search history.

(56) References Cited

U.S. PATENT DOCUMENTS

| | | | |
|---|---|---|---|
| 10,416,629 B1* | 9/2019 | Bingham | G01H 7/00 |
| 11,518,045 B1* | 12/2022 | Alqasemi | B25J 15/0038 |
| 2009/0285664 A1* | 11/2009 | Kim | B25J 9/1612 |
| | | | 414/730 |
| 2014/0214209 A1* | 7/2014 | Sugiura | B25J 9/1612 |
| | | | 310/322 |
| 2024/0278436 A1* | 8/2024 | Furuyama | G01S 15/04 |

* cited by examiner

DIMENSIONS ARE IN MILLIMETERS

//SONICFINGER: LOW-COST, COMPACT, PROXIMITY AND CONTACT SENSOR FOR REACTIVE POSITIONING

CROSS-REFERENCE TO RELATED APPLICATIONS

This application claims benefit of priority under 35 U.S.C. § 119 to U.S. Provisional Patent Application No. 63/407,533, filed on Sep. 16, 2022, in the U.S. Patent and Trademark Office, the disclosure of which is incorporated by reference herein in its entirety.

BACKGROUND

1. Field

The present disclosure relates generally to robotic manipulation, and more particularly to methods, apparatuses, and non-transitory computer-readable mediums for performing reactive positioning of a robot gripper.

2. Description of Related Art

Industrial and/or commercial robots may interact with objects in their surroundings and, consequently, may require real-time estimates of the position of objects that are in close proximity to their grippers. However, objects in close-proximity may be occluded by the gripper and/or by the robot itself.

Recently, tactile sensors may have been developed to attempt to improve robot grasping accuracy and reliability. However, tactile sensors may only provide information during contact. As a result, related robots that use such tactile sensors may be unable to reactively adjust prior to contact in order to achieve a successful grasp. To that end, several modalities may have been implemented to attempt to provide reactive sensing in a proximity (e.g., pre-contact, post-contact) range (e.g., less than 10 millimeters). For example, related sensing systems with proximity detection and/or contact sensing capabilities may allow robots to reactively position their grasp. That is, reactive positioning may help robots align themselves with objects to ensure successful grasps. Despite the existence of several types of proximity and contact sensing modalities on end-effectors, adoption of reactive positioning in robotic manipulation remains limited.

Thus, there exists a need for further improvements to robotic manipulation techniques, as the need for sensors that may perform proximity sensing, object positioning, and contact sensing may be constrained by lack of reliability, ease of use concerns, and/or occlusions in the detection range. Improvements are presented herein. These improvements may also be applicable to other proximity and/or sensing technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for performing reactive positioning of a robot gripper are disclosed by the present disclosure. Aspects of the present disclosure provide for performing proximity and contact sensing for reactive positioning by an end-effector of a robot.

According to an aspect of the present disclosure, an apparatus for performing reactive positioning of a robot gripper is provided. The apparatus includes one or more fingers disposed on an end-effector of the robot, a signal processing circuit, a memory storing instructions, and a processor communicatively coupled to the one or more fingers, the signal processing circuit, and the memory. Each of the one or more fingers includes a transducer configured to generate vibrational energy based on an input signal, and convert an acoustic reflection of the vibrational energy from an object into a voltage signal. The signal processing circuit is configured to provide the input signal to each transducer of the one or more fingers, and perform signal processing on the voltage signal of each transducer of the one or more fingers resulting in reflection data. The processor is configured to execute the instructions to perform pre-touch proximity detection on the reflection data, perform grasp positioning on the reflection data, perform contact detection from the reflection data, and provide, to the robot, results of the pre-touch proximity detection, the grasp positioning, and the contact detection.

In some embodiments, each finger of the one or more fingers may include a flat end surface configured to couple with the end-effector of the robot using a mounting fastener, a first surface including a circular indentation, an acoustic layer disposed in the circular indentation, provided between the first surface and the transducer, and configured to optimize acoustic generation and transmission from the transducer to the first surface, a first foam part disposed on the first surface and the transducer, and a second foam part disposed on a second surface opposite to the first surface.

In some embodiments, the acoustic layer may include an adhesive attaching the transducer to the first surface, and each finger of the one or more fingers may include a sprue that may be disposed in the circular indentation and may be configured to allow excess adhesive of the acoustic layer to flow out of the circular indentation.

In some embodiments, the transducer may be further configured to create vibrations using the transducer in response to the input signal, produce an acoustic aura by causing the vibrations to transfer from the transducer to the finger via the acoustic layer, causing the vibrations to transfer from the finger to the first foam part and the second foam part, and causing the vibrations to transfer from the first foam part and the second foam part to an acoustic transmission media surrounding the first foam part and the second foam part, and receive the acoustic reflection from the object entering the acoustic aura.

In some embodiments, the transducer may be further configured to receive the acoustic reflection from at least one of a top direction, a bottom direction, a front direction, a back direction, and a normal direction.

In some embodiments, the signal processing circuit may be further configured to extract, from the voltage signal, an interference signal including a low amplitude signal corresponding to the acoustic reflection, mix the interference signal with an in-phase copy of the input signal resulting in a proximity signal proportional to undulations of the interference signal, and generate the reflection data by performing an analog-to-digital conversion of a low frequency portion of the proximity signal.

In some embodiments, the processor may be further configured to execute the instructions to divide the reflection data into one or more time windows, obtain spectral information from each of the one or more time windows, combine a portion of the spectral information corresponding to a predetermined frequency range and obtain a total magnitude of the portion of the spectral information, and compare the total magnitude with a detection threshold. In such an embodiment, the results of the pre-touch proximity detection may indicate whether the object has been detected based on the comparison of the total magnitude with the detection threshold.

In some embodiments, the processor may be further configured to execute the instructions to provide the one or more fingers with a calibration signal as the input signal, instruct the end-effector of the robot to approach a calibration object at a predetermined speed, obtain calibration spectral information from calibration reflection data provided by the signal processing circuit based on the calibration signal, and compute the predetermined frequency range and the detection threshold based on the calibration spectral information.

In some embodiments, the processor may be further configured to execute the instructions to instruct the end-effector of the robot to move along an axis perpendicular to the object. In such an embodiment, the processor may be further configured to execute the instructions to, when, based on the reflection data, the object has been detected by at least one finger of the one or more fingers, save a current position of the end-effector of the robot as a first position. In such an embodiment, the processor may be further configured to execute the instructions to instruct the end-effector of the robot to move at least one other finger opposite to the at least one finger towards the object. In such an embodiment, the processor may be further configured to execute the instructions to when, based on the reflection data, the at least one other finger has detected the object, save the current position of the end-effector of the robot as a second position. In such an embodiment, the processor may be further configured to execute the instructions to compute a desired grasp position based on the first position and the second position. The results of the grasp positioning may indicate the desired grasp position.

In some embodiments, the processor may be further configured to execute the instructions to determine whether a signal level change in the reflection data exceeds a contact threshold. The results of the contact detection may indicate whether the object has come into contact with at least one of the one or more fingers.

According to an aspect of the present disclosure, a method for performing reactive positioning by an apparatus is provided. The method includes generating vibrational energy based on an input signal, converting an acoustic reflection of the vibrational energy from an object into a voltage signal, performing signal processing on the voltage signal resulting in reflection data, performing pre-touch proximity detection on the reflection data, performing grasp positioning on the reflection data, performing contact detection from the reflection data, and providing, to an external device, results of the pre-touch proximity detection, the grasp positioning, and the contact detection.

In some embodiments, the method may further include creating vibrations using an acoustic transducer in response to the input signal, producing an acoustic aura by causing the vibrations to transfer to an acoustic transmission media surrounding the apparatus, and receiving the acoustic reflection from the object entering the acoustic aura.

In some embodiments, the method may further include receiving the acoustic reflection from at least one of a top direction, a bottom direction, a front direction, a back direction, and a normal direction.

In some embodiments, the method may further include extracting, from the voltage signal, an interference signal including a low amplitude signal corresponding to the acoustic reflection, mixing the interference signal with an in-phase copy of the input signal resulting in a proximity signal proportional to undulations of the interference signal, and generating the reflection data by performing an analog-to-digital conversion of a low frequency portion of the proximity signal.

In some embodiments, the method may further include dividing the reflection data into one or more time windows, obtaining spectral information from each of the one or more time windows, combining a portion of the spectral information corresponding to a predetermined frequency range and obtain a total magnitude of the portion of the spectral information, and comparing the total magnitude with a detection threshold. The results of the pre-touch proximity detection may indicate whether the object has been detected based on the comparing of the total magnitude with the detection threshold.

In some embodiments, the method may further include providing a calibration signal as the input signal, approaching a calibration object at a predetermined speed, obtaining calibration spectral information from calibration reflection data based on the calibration signal, and computing the predetermined frequency range and the detection threshold based on the calibration spectral information.

In some embodiments, the method may further include instructing the apparatus to move along a first direction perpendicular to the object. In such an embodiment, the method may further include, when, based on the reflection data, the object has been detected by a first sensor, saving a current position as a first position. In such an embodiment, the method may further include instructing the apparatus to move in a second direction finger towards the object. In such embodiment, the method may further include, when, based on the reflection data, the object has been detected by a second sensor, saving the current position as a second position. In such an embodiment, the method may further include computing a desired grasp position based on the first position and the second position. The results of the grasp positioning may indicate the desired grasp position.

In some embodiments, the method may further include determining whether a signal level change in the reflection data exceeds a contact threshold. The results of the contact detection may indicate whether the object has come into contact with the apparatus.

According to an aspect of the present disclosure, an apparatus for performing reactive positioning of a robot gripper is provided. The apparatus includes one or more fingers disposed on an end-effector of the robot, and a signal processing circuit. Each of the one or more fingers includes a flat end surface configured to couple with the end-effector of the robot using a mounting fastener, a first surface including a circular indentation, a transducer disposed in the circular indentation and configured to generate vibrational energy based on an input signal and convert an acoustic reflection of the vibrational energy from an object into a voltage signal, an acoustic layer disposed in the circular indentation, provided between the first surface and the transducer, and attaching the transducer to the first surface, a sprue disposed in the circular indentation and configured to allow excess adhesive of the acoustic layer to flow out of the circular indentation, a first foam part disposed on the first surface and the transducer, and a second foam part disposed on a second surface opposite to the first surface. The signal processing circuit is configured to provide the input signal to each transducer of the one or more fingers, and perform signal processing on the voltage signal of each transducer of the one or more fingers resulting in reflection data.

In some embodiments, the apparatus may further include a memory storing instructions, and a processor communicatively coupled to the one or more fingers, the signal processing circuit, and the memory. The processor may be configured to execute the instructions to determine, based on the reflection data, whether the object has been detected by at least one of the one or more fingers, compute, based on the reflection data, a desired grasp position of the end-effector of the robot with respect to the robot, and detect, based on a signal level change in the reflection data exceeds a contact threshold, whether the object has come into contact with at least one of the one or more fingers.

According to an aspect of the present disclosure, an apparatus for reactive positioning to be performed by a robot including means for performing one or more of the above-described methods.

According to an aspect of the present disclosure, a non-transitory computer-readable storage medium storing computer-executable instructions for performing reactive positioning of a robot gripper is provided. The computer-executable instructions are configured, when executed by one or more processors of the robot, to cause the robot to perform one or more of the above-described methods.

Additional aspects are set forth in part in the description that follows and, in part, may be apparent from the description, or may be learned by practice of the presented embodiments of the disclosure.

BRIEF DESCRIPTION OF THE DRAWINGS

The above and other aspects, features, and advantages of certain embodiments of the present disclosure may be more apparent from the following description taken in conjunction with the accompanying drawings, in which.

DETAILED DESCRIPTION

Figure 1:
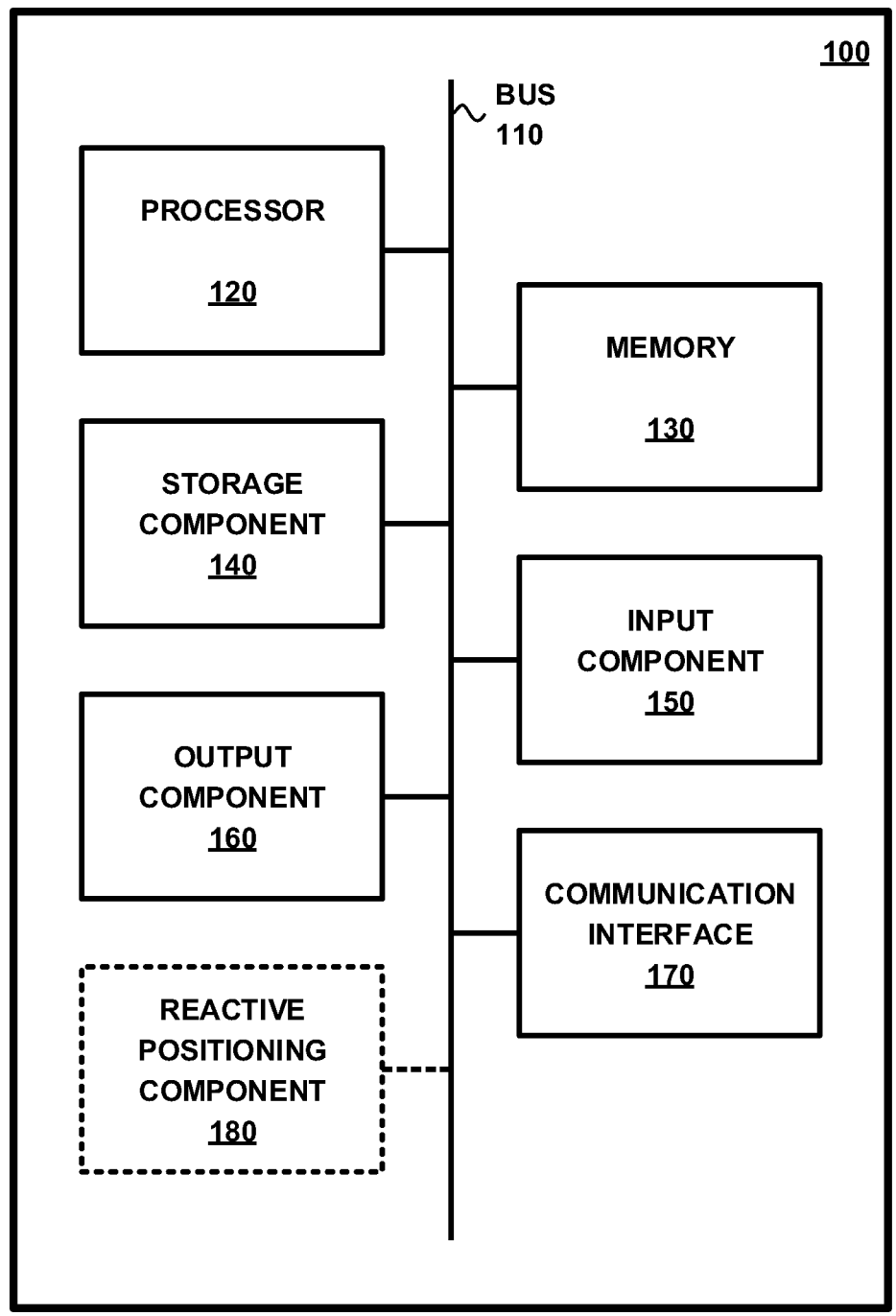
FIG. 1 depicts an example of a device that may be used in implementing one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it is to be apparent to those skilled in the art that these concepts may be practiced without these specific details. In some instances, well known structures and components are shown in block diagram form in order to avoid obscuring such concepts. In the descriptions that follow, like parts are marked throughout the specification and drawings with the same numerals, respectively.

The following description provides examples, and is not limiting of the scope, applicability, or embodiments set forth in the claims. Changes may be made in the function and/or arrangement of elements discussed without departing from the scope of the disclosure. Various examples may omit, substitute, or add various procedures or components as appropriate. For example, the methods described may be performed in an order different from that described, and various steps may be added, omitted, and/or combined. Alternatively or additionally, features described with reference to some examples may be combined in other examples.

Various aspects and/or features may be presented in terms of systems that may include a number of devices, components, modules, and the like. It is to be understood and appreciated that the various systems may include additional devices, components, modules, and the like and/or may not include all of the devices, components, modules, and the like discussed in connection with the figures. A combination of these approaches may also be used.

As a general introduction to the subject matter described in more detail below, aspects described herein are directed towards apparatuses, methods, and non-transitory computer-readable mediums for performing reactive positioning of a robot gripper. Aspects described herein may be used to perform proximity (e.g., pre-touch, post-touch) and/or contact sensing for reactive positioning by an end-effector of a robot.

As described herein, the proximity and contact sensing may be performed using an acoustic transducer embedded in one or more fingers of an end-effector of a robot. That is, aspects presented herein may perform full-surface proximity detection that may be independent of field of view, since the acoustic waves generated by the acoustic transducer may be emitted in a widespread manner (e.g., substantially omnidirectional) from the surfaces of the one or more fingers. As such, aspects presented herein may provide for proximity detection of objects with different shapes and sizes, and/or optical, electrical, magnetic, mechanical properties, and the like, and may depend only on the acoustic reflectivity of the objects. Alternatively or additionally, proximity information from two or more fingers may be combined to align and/or position (e.g., center) objects in between the end-effector of the robot before grasping. Subsequently, the end-effector may be closed and the fingers of the end-effector may be brought into contact with the object. Therefore, according to aspects described herein, a robot may be notified about the start, persistence, and/or end of a contact with an object by the fingers of the end-effector.

Aspects presented herein may provide for a low-cost, compact, easy to manufacture, and deploy finger that may contain a single acoustic transducer used to create an aura around the finger and sense changes in reflected signals. Alternatively or additionally, a balanced detection circuit and/or a coherent detection pipeline may be used to extract small changes in the reflected signals that may be provided to algorithms that may perform pre-touch/post-touch proximity detection, grasp positioning, and/or contact detection. That is, aspects presented herein provide a pre-grasp and contact sensor for pre-grasp sensing that may perform full-surface proximity detection unaffected by optical occlusions and that may be independent of the optical properties of the object.

As noted above, certain embodiments are discussed herein that relate to reactive positioning of a robot gripper. Before discussing these concepts in further detail, however, an example of a computing device that may be used in implementing and/or otherwise providing various aspects of the present disclosure is discussed with respect to FIG. 1.

FIG. 1 depicts an example of a device 100 that may be used in implementing one or more aspects of the present disclosure in accordance with one or more illustrative aspects discussed herein. For example, device 100 may, in some instances, implement one or more aspects of the present disclosure by reading and/or executing instructions and performing one or more actions accordingly. In one or more arrangements, device 100 may represent, be incorporated into, and/or include a robotic device, a robot controller, a desktop computer, a computer server, a virtual machine, a network appliance, a mobile device (e.g., a laptop computer, a tablet computer, a personal digital assistant (PDA), a smart phone, any other type of mobile computing device, and the like), a wearable device (e.g., smart watch, headset, headphones, and the like), a smart device (e.g., a voice-controlled virtual assistant, a set-top box (STB), a refrigerator, an air conditioner, a microwave, a television, and the like), an Internet-of-Things (IoT) device, and/or any other type of data processing device.

For example, the device 100 may include a processor, a personal computer (PC), a printed circuit board (PCB) including a computing device, a mini-computer, a main-frame computer, a microcomputer, a telephonic computing device, a wired/wireless computing device (e.g., a smart-phone, a PDA), a laptop, a tablet, a smart device, a wearable device, or any other similar functioning device.

In some embodiments, as shown in FIG. 1, the device 100 may include a set of components, such as a processor 120, a memory 130, a storage component 140, an input component 150, an output component 160, a communication interface 170, and a reactive positioning component 180. The set of components of the device 100 may be communicatively coupled via a bus 110.

The bus 110 may include one or more components that may permit communication among the set of components of the device 100. For example, the bus 110 may be a communication bus, a cross-over bar, a network, or the like. Although the bus 110 is depicted as a single line in FIG. 1, the bus 110 may be implemented using multiple (e.g., two or more) connections between the set of components of device 100. The present disclosure is not limited in this regard.

The device 100 may include one or more processors, such as the processor 120. The processor 120 may be implemented in hardware, firmware, and/or a combination of hardware and software. For example, the processor 120 may include a central processing unit (CPU), an application processor (AP), a graphics processing unit (GPU), an accelerated processing unit (APU), a microprocessor, a microcontroller, a digital signal processor (DSP), a field-programmable gate array (FPGA), an application-specific integrated circuit (ASIC), an image signal processor (ISP), a neural processing unit (NPU), a sensor hub processor, a communication processor (CP), an artificial intelligence (AI)-dedicated processor designed to have a hardware structure specified to process an AI model, a general purpose single-chip and/or multi-chip processor, or other programmable logic device, discrete gate or transistor logic, discrete hardware components, or any combination thereof designed to perform the functions described herein. A general purpose processor may include a microprocessor, or any conventional processor, controller, microcontroller, or state machine.

The processor 120 may also be implemented as a combination of computing devices, such as a combination of a DSP and a microprocessor, a combination of a main processor and an auxiliary processor, a plurality of microprocessors, one or more microprocessors in conjunction with a DSP core, or any other such configuration. In some embodiments, particular processes and methods may be performed by circuitry that is specific to a given function. In optional or additional embodiments, an auxiliary processor may be configured to consume less power than the main processor. Alternatively or additionally, the one or more processors may be implemented separately (e.g., as several distinct chips) and/or may be combined into a single form.

The processor 120 may control overall operation of the device 100 and/or of the set of components of device 100 (e.g., the memory 130, the storage component 140, the input component 150, the output component 160, the communication interface 170, the reactive positioning component 180).

The device 100 may further include the memory 130. In some embodiments, the memory 130 may include volatile memory such as, but not limited to, random access memory (RAM), static RAM (SRAM), dynamic RAM (DRAM), and the like. In optional or additional embodiments, the memory 130 may include non-volatile memory such as, but not limited to, read only memory (ROM), electrically erasable programmable ROM (EPROM), NAND flash memory, phase-change RAM (PRAM), magnetic RAM (MRAM), resistive RAM (RRAM), ferroelectric RAM (FRAM), magnetic memory, optical memory, and the like. However, the present disclosure is not limited in this regard, and the memory 130 may include other types of dynamic and/or static memory storage. In an embodiment, the memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further include the input component 150. The input component 150 may include one or more components that may permit the device 100 to receive information, such as via user input (e.g., a touch screen, a keyboard, a keypad, a mouse, a stylus, a button, a switch, a microphone, a camera, a virtual reality (VR) headset, haptic gloves, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, a buzzer, an alarm, and the like).

The device 100 may further include the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as, FlashLinQ, WiMedia, Bluetooth™, Bluetooth™ Low Energy (BLE), ZigBee, Institute of Electrical and Electronics Engineers (IEEE) 802.11x (Wi-Fi), LTE, 5G, and the like. In optional or additional embodiments, the communication interface 170 may include an Ethernet interface, an optical interface, a coaxial interface, an infrared interface, a radio frequency (RF) interface, a USB interface, an IEEE 1394 (FireWire) interface, or the like.

In some embodiments, the device 100 may include the reactive positioning component 180, which may be configured to perform pre-touch/post-touch proximity detection and/or contact sensing for reactive positioning. For example, the reactive positioning component 180 may be configured to generate vibrational energy, convert acoustic reflections from an object into a voltage signal, perform signal processing on the voltage signal, perform pre-touch/post-touch proximity detection, perform grasp positioning, perform contact detection, and provide the results to an external device.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A non-transitory memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may perform one or more functions described as being performed by another set of components shown in FIG. 1.

Having discussed an example of a device that may be used in providing and/or implementing various aspects of the present disclosure, a number of embodiments are now discussed in further detail. In particular, and as introduced above, some aspects of the present disclosure generally relate to performing reactive positioning of a robot gripper.

Figure 2:
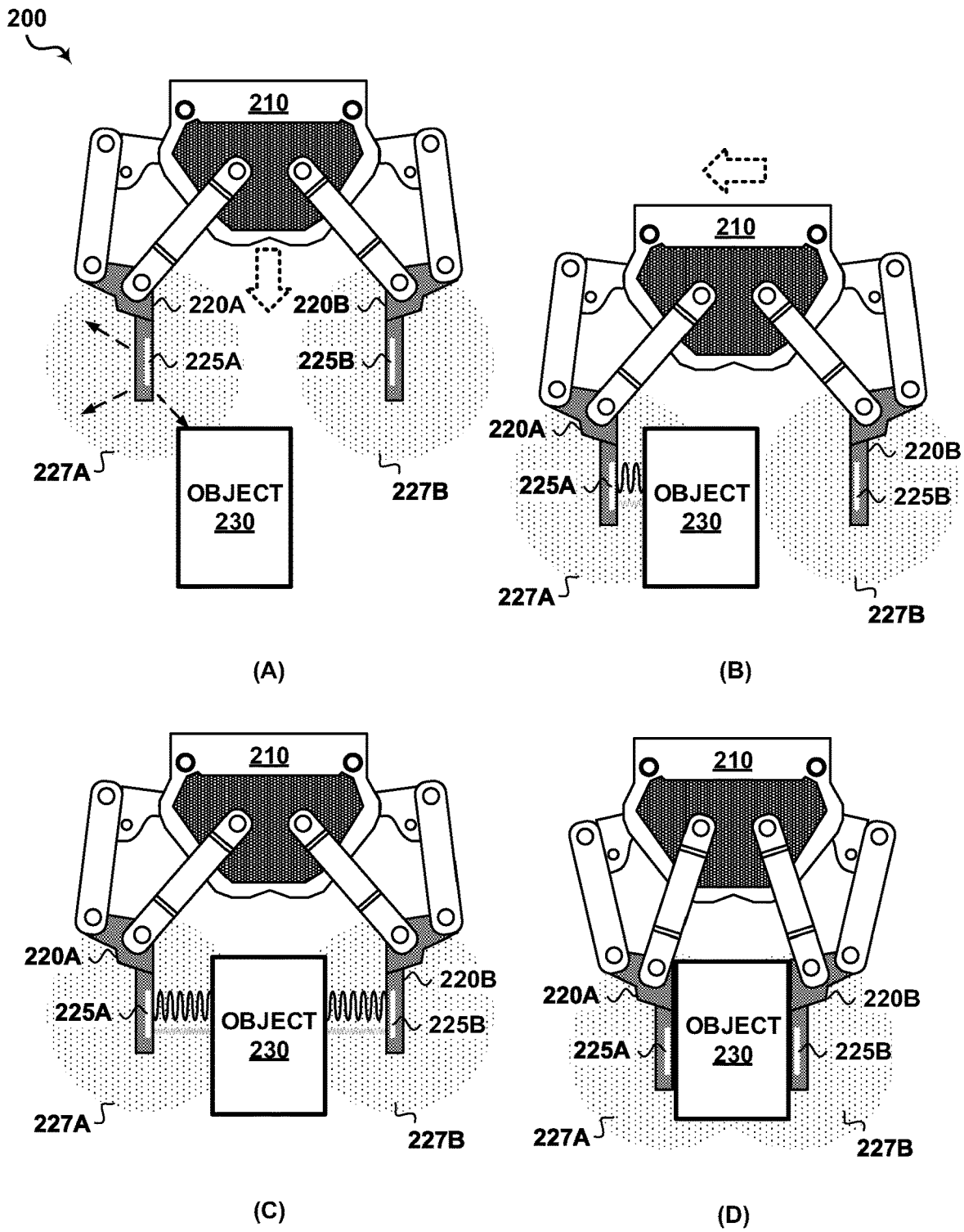
FIG. 2 illustrates an example of performing reactive positioning of a robot gripper, in accordance with various aspects of the present disclosure.

FIG. 2 illustrates an example of performing reactive positioning of a robot gripper, in accordance with various aspects of the present disclosure. The reactive positioning process 200 of FIG. 2 may include pre-grasp detection, grasp positioning, and/or contact detection.

In some embodiments, at least a portion of the reactive positioning process 200 may be performed by the device 100 of FIG. 1, which may include the reactive positioning component 180. Alternatively or additionally, another computing device (e.g., a robotic device, a robot controller, a server, a laptop, a smartphone, a user equipment (UE), a wearable device, a smart device, an IoT device, and the like) that includes the reactive positioning component 180 may perform at least a portion of the reactive positioning process 200.

Referring to FIG. 2, the reactive positioning process 200 may include an end-effector 210 (e.g., a robot gripper) of a robot approaching an object 230, as shown in (A). In an embodiment, the end-effector 210 may include one or more fingers (e.g., first finger 220A and second finger 220B, hereinafter "220" generally). Each finger 220 may include a transducer (e.g., first transducer 225A, second transducer 225B, hereinafter "225" generally). For example, the transducer 225 may be and/or include an acoustic transducer such as, but not limited to, a piezoelectric transducer, a ceramic transducer, a crystal transducer, a film transducer, a magnetostrictive transducer, a capacitive transducer, a magnetic coil (e.g., a speaker), and the like. In an embodiment, a piezoelectric transducer may be preferred due to a low-cost and/or a widespread availability of such types of transducers. As used herein, an acoustic transducer may refer to a device that may convert an applied electric charge to a mechanical vibration (e.g., sound) and/or a device that may convert an incident mechanical vibration into an electrical signal (e.g., voltage, current, impedance, and the like). Alternatively or additionally, the acoustic transducer 225 described herein may generate and/or receive acoustic signals that may be within a human audible range and/or may be outside of the human audible range. Furthermore, the acoustic transducer 225 of the present disclosure may generate and/or receive acoustic signals that may travel via a gas (e.g., air), a liquid, and/or a solid. For example, the end-effector 210 may be configured to perform movements inside a volume of gas (e.g., air) and/or a volume of liquid (e.g., water). In an embodiment, the transducer 225 may be able to generate mechanical vibrations at a same time that the transducer is receiving mechanical vibrations.

The transducer 225 may be configured, according to an embodiment, to generate vibrational energy based on an input signal. For example, the transducer 225 may generate, based on the input signal, an acoustic aura and/or acoustic field (e.g., first acoustic aura 227A, second acoustic aura 227B, hereinafter "227" generally) that may extend in a widespread manner (e.g., substantially omnidirectional) from the transducer 225. That is, the acoustic aura 227 may extend in substantially every direction (e.g., front/back, up/down, left/right) from the transducer 225. It is to be understood that the two-dimensional representations of the acoustic aura 227 in FIG. 2 are for example only and are not intended to be limiting. As such, in practice, the transducer 225 may form a three-dimensional (3D) acoustic aura 227 that may be centered around the transducer 225. That is, the present disclosure is not limited in this regard.

In an embodiment, the input signal provided to the transducer 225 to generate the acoustic aura 227 may be and/or may include an alternating voltage. For example, the input signal may have a predetermined frequency (e.g., 40 kilohertz (kHz), several megahertz (MHz), and the like). Alternatively or additionally, the frequency of the input signal may be determined based on at least one of the shape of the finger 220, a material of the finger 220, and the like. For example, the input signal frequency may be set to a first frequency when a finger 220 is constructed from a metal (e.g., aluminum). For another example, the input signal frequency may be set to a second frequency, that may be different from the first frequency, when the finger 220 is constructed from plastic and/or another material. In an optional or additional embodiment, the frequency of the input signal may be determined based on a calibration process as described with reference to FIG. 9.

The transducer 225, according to an embodiment, may be further configured to convert acoustic reflections of the acoustic aura 227 (e.g., vibrational energy) from an object 230 into a voltage signal. For example, as shown in FIG. 2, the object 230 may be located within an acoustic aura 227 of at least one finger 220, and consequently, the object 230 may reflect at least a portion of the acoustic aura 227 incident on the object 230 back to the transducer 225 as a reflected signal. The reflected signals may be sensed by the transducer 225. For example, the reflected signals may cause an effective alternating current (AC) impedance of the transducer 225 to change. That is, the effective AC impedance of the transducer 225 may change according to an amount (e.g., total energy) of reflected acoustic signals received by the transducer 225. Alternatively or additionally, the effective AC impedance of the transducer 225 may change according to a phase change of reflected acoustic signals received by the transducer 225.

Continuing to refer to FIG. 2, the end-effector 210 may be configured to approach the object 230 (e.g., move nearer to the object 230 as represented by the dashed down arrow in (A)) until the object 230 enters the acoustic aura 227 of at least one finger 220, as shown in (A). When the object 230 enters the acoustic aura 227 of the finger 220, the object 230 may cause at least a portion of the acoustic aura 227 incident on the object 230 to be reflected back to the transducer 225 of the finger 220 as a reflected signal. Based on reflected signal, the end-effector 210 may detect proximity to the object 230 using at least one finger 220 (e.g., finger 220A) that is closest (smallest distance) to the object 230, as shown in (B).

In an embodiment, the end-effector 210 may be further configured to align and/or position (e.g., center) the one or more fingers 220 with respect to the object 230 in order to maximize a probability of a successful grasp of the object 230 by the one or more fingers 220. Alternatively or additionally, the end-effector 210 may be configured to align itself with respect to the object 230 without making contact with the object 230. For example, assuming that the object 230 is symmetrical across a horizontal axis (e.g., x-axis, y-axis), it may be determined that the end-effector 210 may need to be aligned at a center position along the horizontal axis with respect to the object 230 (as shown in (C) of FIG. 2) in order to potentially prevent the object from tipping and/or to maximize a probability of successfully grasping the object 230. That is, if the first finger 220A comes into contact with the object 230 before the second finger 220B comes into contact with the object 230, the object 230 may tip over and/or fall down, which could result in an unsuccessful grasp. However, if the first finger 220A and the second finger 220B come into contact with the object 230 at a substantially similar and/or the same time, the object 230 may not tip over, which may result in a successful grasp. In another example, it may be determined that the end-effector 210 may need to be located at a position other than the center in order to maximize a probability of a successful grasp. That is, the present disclosure is not limited as to the grasp position of the end-effector 210 relative to the object 230.

In an embodiment, the end-effector 210 may remain in a static position (e.g., a substantially similar position) at a fixed distance from the object 230. That is, the end-effector 210 may monitor a position of the object 230 based on the proximity information obtained from the portion of the acoustic aura 227 that is reflected back to the transducer 225 of the finger 220. In an optional or additional information, the end-effector 210 may maintain a relative distance from the object 230. That is, if or when the object 230 moves, the end-effector 210 may detect the movement of the object 230 based on the proximity information, and move in a commensurate manner in order to maintain a substantially similar and/or a same distance relative to the object 230.

As shown in (D) of FIG. 2, the end-effector 210 may grasp the object 230 with the one or more fingers 220. In such an example, the finger 220 may be configured to detect that the finger 220 has come into contact with the object 230 and/or may determine that the finger 220 remains in contact with the object 230.

In an embodiment, the end-effector 210 may continue to detect proximity to the object 230 using at least one finger 220 (e.g., finger 220A) that is closest (smallest distance) to the object 230 after contact with the object 230 has been terminated (e.g., the object 230 has been released). That is, the end-effector 210 may be configured to retreat (e.g., move away) from the object 230 (e.g., after releasing the object 230) until the object 230 is no longer within the acoustic aura 227 of the at least one finger 220, and as a result, the end-effector 210 may no longer detect proximity to the object 230.

Although not shown in FIG. 2, in an embodiment, the end-effector 210 may use the finger 220 in conjunction with a related robot manipulation system that may be based on optical sensors, electrical sensors, and/or capacitive sensors. For example, the end-effector 210 may use the finger 220 as a primary object detection system and use the related robot manipulation system as a complimentary system. Alternatively or additionally, the end-effector 210 may use the related robot manipulation system as the primary object detection system and use the finger 220 as the complimentary system. The present disclosure is not limited in this regard.

By using a widespread (e.g., substantially omnidirectional) vibrational energy (e.g., acoustic signals) for detecting the proximity of an object 230 and/or contact with the object 230, the finger 220 may avoid occlusions that may affect related robotic manipulation systems that may rely on optical sensors (e.g., cameras). For example, such related robotic manipulation systems may be unable to detect an object 230 that may be located outside a field-of-view of the optical sensors, that may be obstructed by another object, and/or that may be too close to the optical sensor (e.g., a distance between optical sensor and the camera is less than a certain threshold). Alternatively or additionally, related robotic manipulation systems may be unable to detect an object 230 based on the optical, electrical, magnetic, and/or mechanical properties of the object (e.g., transparency, optical reflectivity, dielectric constant, and the like). However, according to the present disclosure, the object 230 may only need to be able to reflect acoustic signals to be detected. Furthermore, by locating the transducer 225 within the finger 220, a more accurate measurement may be taken as to the proximity of the object 230 when compared to related robotic manipulation systems that may arrange their sensors separately from their gripping devices (e.g., fingers).

Figure 3:
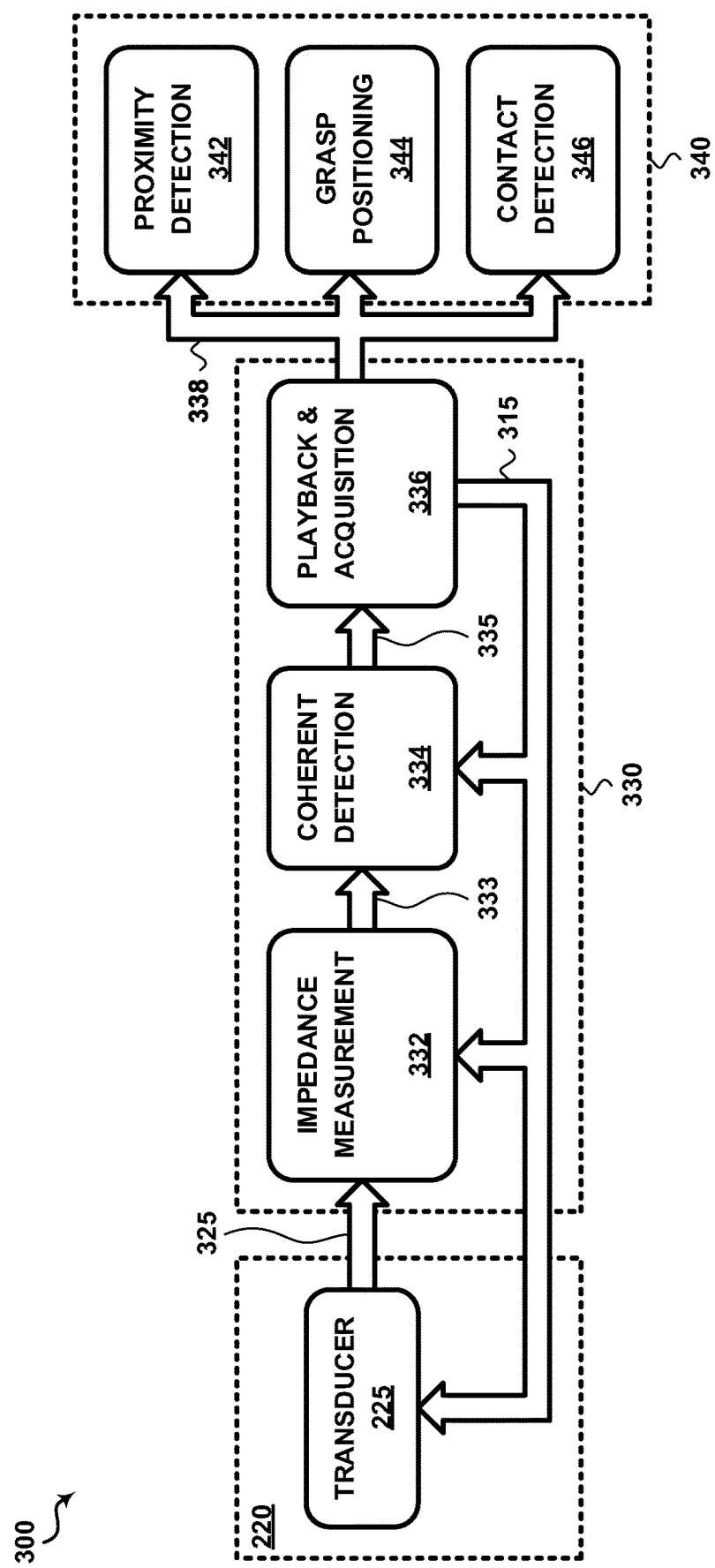
FIG. 3 depicts an example of a process flow for performing reactive positioning of a robot gripper, in accordance with various aspects of the present disclosure.

FIG. 3 depicts an example of a process flow for performing reactive positioning of a robot gripper, in accordance with various aspects of the present disclosure.

Referring to FIG. 3, a process flow 300 for performing reactive positioning by a device that implements one or more aspects of the disclosure is illustrated. In some embodiments, at least a portion of the operations and/or functions depicted by the process flow 300 may be performed by the device 100 of FIG. 1, which may include the reactive positioning component 180. Alternatively or additionally, another computing device (e.g., a robotic device, a robot controller, a server, a laptop, a smartphone, a UE, a wearable device, a smart device, an IoT device, and the like) that includes the reactive positioning component 180 may perform at least a portion of the process flow 300.

In some embodiments, the process flow 300 depicted in FIG. 3 may be used to implement the reactive positioning process 200 described with reference to FIG. 2 and may include additional features not mentioned above.

As shown in FIG. 3, the finger 220 with transducer 225 may receive, from the signal processing pipeline 330, a tone signal 315 as an input signal. The tone signal 315 may be and/or may include an alternating voltage. For example, the tone signal 315 may have a predetermined frequency (e.g., 40 kHz, several MHz, and the like). For another example, the tone signal 315 may be and/or may include a pulse having two or more frequencies. That is, the tone signal 315 may comprise one or more frequencies. Alternatively or additionally, the frequency of the tone signal 315 may be determined based on at least one of the shape of the finger 220, a material of the finger 220, and the like. For example, the frequency of the tone signal 315 may be set to a first frequency when a finger 220 is constructed from a metal (e.g., aluminum). For another example, the frequency of the tone signal 315 may be set to a second frequency, that may be different from the first frequency, when the finger 220 is constructed from plastic and/or another material. In an optional or additional embodiment, the frequency of the tone signal 315 may be determined based on a calibration process as described with reference to FIG. 9.

In an embodiment, the tone signal 315 may be provided to the transducer 225, which may be and/or may include a piezoelectric transducer such as, but not limited to, a piezoelectric transducer, a ceramic transducer, a crystal transducer, a film transducer, a magnetostrictive transducer, a capacitive transducer, a magnetic coil (e.g., a speaker), and the like. The transducer 225 may be excited by the tone signal 315, which may cause the transducer 225 to vibrate at a substantially similar and/or the same frequency of the tone signal 315. In an embodiment, the transducer 225 may be configured to oscillate at least one frequency when a direct current (DC) signal (e.g., tone signal 315) is applied to the transducer 225. For example, the transducer may be configured to oscillate at the frequency of the tone signal 315 and/or to oscillate at one or more harmonics of the frequency of the tone signal 315. Alternatively or additionally, the transducer may be configured to oscillate at one or more combinations of frequencies (e.g., additions, differences) of the tone signal 315.

The vibrational energy generated by the transducer 225 may cause the finger 220 to vibrate and/or may cause an acoustic transmission media (e.g., a gas, a liquid, a solid) near and/or adjacent to the finger 220 to vibrate, thus creating an acoustic aura 227, as described with reference to FIG. 2.

When an object (e.g., object 230 of FIG. 2) enters the acoustic aura 227 of the transducer 225, at least a portion of the acoustic aura 227 incident on the object 230 may be reflected back to the transducer 225 as a reflected signal. The reflected signal may be sensed by the transducer 225. For example, the reflected signal may cause an effective alternating current (AC) impedance 325 of the transducer 225 to change. That is, the effective AC impedance 325 of the transducer 225 may change according to an amount (e.g., total energy) of reflected acoustic signals received by the transducer 225. In an embodiment, the effective AC impedance 325 may comprise pre-touch information and/or post-touch information. As used herein, pre-touch information may refer to changes in the effective impedance 325 of the transducer 225 that may be caused by the reflected acoustic signals received by the transducer 225, which may occur prior to contacting the object 230. Alternatively or additionally, post-touch information may refer to changes in the effective impedance 325 of the transducer 225 that may be caused by the reflected acoustic signals received by the transducer 225, which may occur after releasing contact with the object 230.

In an embodiment, the transducer 225 may be operated in a full-duplex mode in which the transducer 225 may simultaneously generate the vibrational energy based on the tone signal 315 and receive the reflected acoustic signals from the object 230. Alternatively or additionally, the transducer 225 may be operated in a half-duplex mode in which the transducer 225 may separately generate the vibrational energy based on the tone signal 315 and receive the reflected acoustic signals from the object 230. For example, the transducer 225 may only generate the vibrational energy based on the tone signal 315 during transmitting time periods and/or may only receive the reflected acoustic signals from the object 230 during listening time periods. Throughout the present disclosure, the transducer 225 may be assumed to operate in the full-duplex mode. However, the present disclosure is not limited in this regard. For example, in an embodiment, the transducer 225 may include a first transducer configured to transmit the vibrational energy and a second transducer configured to receive the reflected acoustic signals from the object 230. In such an embodiment, the transducer 225 may operate in the full-duplex mode and/or in the half-duplex mode, as described above.

Continuing to refer to FIG. 3, an impedance measurement component 332 of the signal processing pipeline 330 may monitor the effective impedance 325 of the transducer 225 and/or measure changes in the effective impedance 325 of the transducer 225 that may be caused by the reflected acoustic signals received by the transducer 225, as discussed with reference to FIGS. 6A and 7. In an embodiment, the effective impedance 325 of the transducer 225 may be complex. That is, the effective impedance 325 of the transducer 225 may include an amplitude and/or a phase, in addition to a resistance.

In an embodiment, the impedance measurement component 332 may provide voltage signals 333 to a coherent detection component 334, as shown in FIG. 3. The voltage signals 333 may correspond to the changes in the effective impedance 325 of the transducer 225 as measured by the impedance measurement component 332. In the case where the transducer 225 operates in the full-duplex mode and is used to simultaneously transmit the tone signal 315 and receive the reflected acoustic signals from the object 230, the voltage signals 333 may include the tone signal 315. That is, the output of the impedance measurement component 332 may include a copy of the transmitted tone signal 315 with the proximity information 325 that may appear as undulations in the voltage signals 333. For example, the proximity information 325 may appear as increases and/or decreases in the amplitude (and/or phase) of the voltage signals 333 that may be within an envelope as a function of distance (and/or time) between the finger 220 and the object 230.

The coherent detection component 334 may be configured to extract and/or amplify the pre-touch/post-touch configuration present in the voltage signals 333, as described with reference to FIGS. 6B and 7. That is, the coherent detection component 334 may be configured to produce, from the voltage signals 333, a DC proximity signal 335 proportional to the undulations of the voltage signals 333. In an embodiment, the transducer 225 may be excited with a signal (e.g., tone signal 315) that may be locked to a signal reference that may supply reference signals to the transducer 225 and/or to the coherent detection component 334, such as for example, the playback and acquisition component 336. For example, the transducer 225 may be excited with the tone signal 315 and the coherent detection component 334 may demodulate the output of the transducer 225 with a same tone signal 315. However, the present disclosure is not limited in this regard. In an optional or additional embodiment, the transducer 225 may be excited with the tone signal 315 and the coherent detection component 334 may demodulate the output of the transducer 225 with a harmonic of the tone signal 315. In another optional or additional embodiment, the coherent detection component 334 may demodulate the output of the transducer 225 with the product of the tone signal 315 and another signal (e.g., similar to having a carrier frequency modulated with a data signal). That is, the transmitted signals (e.g., tone signal 315) and the demodulation configuration of the receive signal may be varied according to design constraints, such as, but not limited to, the detection of non-linear reflection properties in the object 230, without departing from the scope of the present disclosure.

For example, by way of explanation and not intended to be a limiting example, the tone signal 315 may have a frequency of 100 kHz (e.g., a 100 kHz acoustic signal may be transmitted to the acoustic transmission media (e.g., a gas, a liquid, a solid)) and the coherent detection component 334 may be configured to detect the received signal at 100 kHz. For another example, the transducer 225 may be configured to vibrate with a 1 kHz signal that is phase-locked to a tone signal 315 having a frequency of 100 kHz. In such an example, the coherent detection component 334 may be configured to multiply the received signal with the 100 kHz reference signal to obtain a 1 kHz data signal. The coherent detection component 334 may be further configured to multiply the 1 kHz data signal with a 1 kHz reference signal to obtain the DC proximity signal 335 that may be proportional to undulations of the voltage signals 333. In this manner, small distance changes (in relation to the transducer 225 and the object 230) may be detected.

The playback and acquisition component 336 may be configured to generate reflection data 338 by performing an analog-to-digital conversion (ADC) of a low frequency portion of the proximity signal 335. Alternatively or additionally, the playback and acquisition component 336 may be configured to generate the tone signal 315 and provide the tone signal 315 to the transducer 225, the impedance measurement component 332, and/or the coherent detection component 334.

Although as shown in FIG. 3, the signal processing pipeline 330 is connected to one finger 220 that may include one transducer 225, the present disclosure is not limited in this regard. For example, the signal processing pipeline 330 may provide a tone signal 315 and/or may measure the effective impedance 325 of two or more transducers 225 that may be disposed on two or more fingers 220. In such an example, the reflection data 338 may comprise a distinct proximity signal 335 from each of the one or more transducers 225 connected to the signal processing pipeline 330. Alternatively or additionally, the signal processing pipeline 330 may comprise a distinct signal processing pipeline (e.g., a distinct impedance measure component 332, a distinct coherent detection component 334, and/or a distinct playback and acquisition component 336) for each of the two or more transducers 225 of the two or more fingers 220. In such an example, the data processing device 340 may be provided, by each playback and acquisition component 336, with a distinct reflection data 338 corresponding to each of the two or more transducers 225 of the two or more fingers 220. Alternatively or additionally, the data processing device 340 may be provided with a reflection data 338 that may combine the distinct reflection data 338 from each of the two or more transducers 225 of the two or more fingers 220.

In an embodiment, the reflection data 338 generated by the playback and acquisition component 336 of the signal processing pipeline 330 may be provided to one or more algorithms and/or components for performing pre-touch/post-touch proximity detection, grasp positioning, contact detection, and the like. For example, the reflection data 338 may be provided to a data processing device 340 that may be configured to perform at least one of the pre-touch/post-touch proximity detection, the grasp positioning, and the contact detection.

The data processing device 340, according to an embodiment, may be and/or may include the device 100 of FIG. 1, which may include the reactive positioning component 180, to perform at least one of the pre-touch/post-touch proximity detection, the grasp positioning, and the contact detection. Alternatively or additionally, the data processing device 340 may include another computing device (e.g., a robotic device, a robot controller, a server, a laptop, a smartphone, a UE, a wearable device, a smart device, an IoT device, and the like) that may include the reactive positioning component 180 to perform at least one of the pre-touch/post-touch proximity detection, the grasp positioning, and the contact detection. For another example, the data processing device 340 may include analog signal processing elements (e.g., resistors, capacitors, amplifiers, and the like) configured to perform at least a portion of the pre-touch/post-touch proximity detection, the grasp positioning, and/or the contact detection. In an optional or additional embodiment, the data processing device 340 may be configured to provide, to the robot, results of at least one of the pre-touch/post-touch proximity detection, the grasp positioning, and the contact detection.

As shown in FIG. 3, the data processing device 340 may include a proximity detection component 342, a grasp positioning component 344, and a contact detection component 346. The proximity detection component 342 may be configured to perform pre-touch/post-touch proximity detection based at least on the reflection data 338, as described with reference to FIGS. 8 and 10. In an embodiment, results from the proximity detection component 342 may be used to determine whether an object (e.g., object 230) has been detected by at least one of the fingers 220. For example, the robot may use results from the proximity detection component 342 to avoid contacting the object 230 while approaching and/or positioning the end-effector 210 in the vicinity of the object 230.

In an optional or additional embodiment, the results from the proximity detection component 342 may be used to effect other changes to the end-effector 210 in the proximity of the object 230, such as, but not limited to, switching control software and/or algorithms used on the end-effector 210 and rerouting power to motors that may control the movement of the end-effector 210. For example, the robot may use results from the proximity detection component 342 to switch from a first configuration (e.g., first control software and/or first control motors) for approaching the object 230 to a second configuration (e.g., second control software and/or second control motors) for fine-tuning the position and/or movement of the end-effector 210 when the end-effector 210 is proximate to the object 230. For another example, the robot may use results from the proximity detection component 342 to switch to a third configuration (e.g., third control software and/or third control motors) for retreating (e.g., moving away) from the object 230. In yet another example, the robot may use the results from the proximity detection component 342 to switch to a fourth configuration (e.g., fourth control software and/or fourth control motors) for maintaining a distance relative to the object 230. That is, as used herein, reactive positioning may refer to performing physical and/or non-physical changes to the end-effector 210 in response to detecting proximity to the object 230.

The grasp positioning component 344 may be configured to perform grasp positioning based at least on the reflection data 338, as described with reference to FIG. 8. In an embodiment, results from the grasp positioning component 344 may be used to position the end-effector 210 with respect to the object 230 without making contact with the object 230. For example, the robot may use results from the grasp positioning component 344 to align the end-effector 210 with respect to the object 230 to maximize a probability of a successful grasp of the object 230 by the one or more fingers 220.

The contact detection component 346 may be configured to perform contact detection based at least on the reflection data 338, as described with reference to FIGS. 9 and 11. In an embodiment, results from the contact detection component 346 may be used to determine whether at least one of the fingers 220 of the end-effector 210 has come into contact with the object 230. For example, the robot may use results from the contact detection component 346 to determine whether the end-effector 210 has successfully grasped the object 230 with the one or more fingers 220.

The number and arrangement of components of the process flow 300 shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Alternatively or additionally, a set of (one or more) components shown in FIG. 3 may be integrated with each other, and/or may be integrated with the finger 220 and implemented as an integrated circuit, as software, and/or a combination of circuits and software. For another example, each of the proximity detection component 342, the grasp positioning component 344, and the contact detection component 346 may be implemented in multiple data processing devices 340 that may be in communication with each other (e.g., via a wired/wireless network, via dedicated wires) and/or with the robot.

Figure 4A:
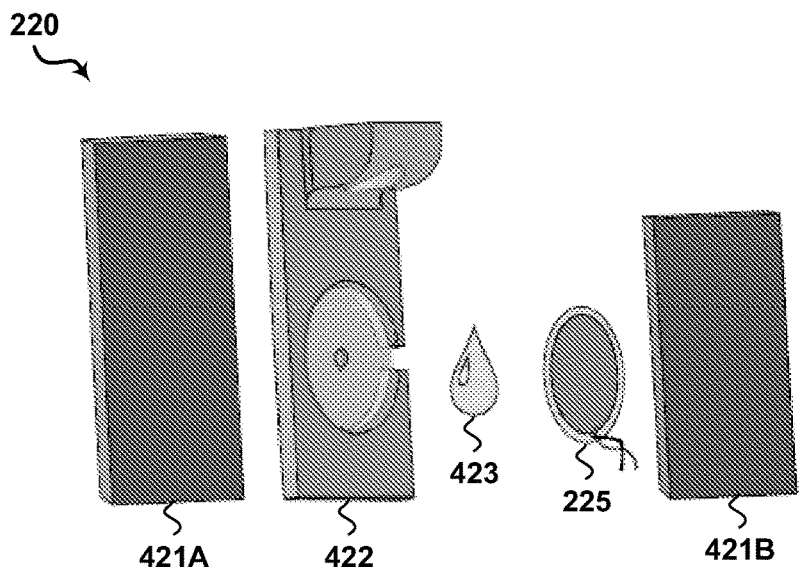
FIG. 4A illustrates an exploded view of an example finger, in accordance with various aspects of the present disclosure.

FIG. 4A illustrates an exploded view of an example finger, in accordance with various aspects of the present disclosure. Referring to FIG. 4A, the finger 220 may include a finger structure 422 that may have a relatively large contact surface (e.g., normal surface) for sensing and/or gripping along with a standard mounting end for attaching to the end-effector 210 of the robot. The mounting end of the finger structure 422 may be configured to attach to a variety of end-grippers using a single mounting screw (e.g., a single M5 socket headcap screw), for example. However, the present disclosure is not limited in this regard. That is, the mounting end of the finger structure 422 may have other shapes, sizes, and/or mounting configurations for mounting the finger structure 422 to an end-effector 210 of a robot.

The finger structure 422, according to an embodiment, may be manufactured using a three-dimensional (3D) printing process. However, the present disclosure is not limited in this regard, and the finger structure 422 may be manufactured using other types of manufacturing processes.

Alternatively or additionally, the finger structure 422 may be constructed out of a rigid material, such as, but not limited to, a metal (e.g., aluminum), a plastic, and the like.

As shown in FIG. 4A, a back surface of the finger structure 422 may include a circular indentation in which the transducer 225 may be disposed. For example, the transducer 225 may rest inside of the circular indentation on top of an acoustic layer 423. In an embodiment, the acoustic layer 423 may be configured to optimize acoustic generation and transmission from the transducer to the back surface. Alternatively or additionally, the acoustic layer 423 may be and/or may include an adhesive that may attach the transducer to the back surface. In another example, the transducer may be mechanically attached to the back surface (e.g., using one or more screws).

In an optional or additional embodiment, the depth of the circular indentation may be sufficient to prevent a top surface of the transducer 225 to extend beyond a plane of the back surface of the finger structure 422. That is, a level of the top surface of the transducer 225 may be substantially co-planar with the back surface of the finger structure 422. For example, the width of the finger structure 422 at the sensing and gripping area may be about 4 millimeters (mm), and the circular indent may have a depth of about 3 mm and may be disposed in a portion of the finger structure 422 having a thickness of about 1 mm. In such an example, the combined overall height of the adhesive layer 423 and the transducer 225 may not exceed 3 mm, such that the top surface of the transducer 225 does not exceed the depth of the circular indent and/or does not exceed a level of the back surface of the finger structure 422.

In an embodiment, the circular indent may include a sprue configured to allow excess adhesive to flow out of the circular indent, thus allowing for the creation of the acoustic layer 423 having a uniform thickness. In an optional or additional embodiment, the sprue may be located in the center of the circular indent. The acoustic layer 423 may be and/or may include a thermoplastic adhesive (e.g., a hot melt glue) capable of adhering the transducer 225 to a fixed position within the circular indent and of transferring vibrational energy (e.g., acoustic signals) generated by the transducer 225 to the finger structure 422.

The side of the finger structure 422 having the contact surface (e.g., normal side) may be at least partially covered with a first foam layer 421A. The first foam layer 421A may provide a compliant (e.g., conforming) gripping surface to the finger structure 422 and/or may assist the finger 220 in achieving a successful grip of the object 230. Alternatively or additionally, the first foam layer 421A may provide protection to the transducer 225 against mechanical damage. The first foam layer 421A may be attached to the finger structure 422 using a backing glue. However, the present disclosure is not limited in this regard, and the first foam layer 421A may be attached to the finger structure 422 using other attachment methods.

The first foam layer 421A may include a foam material that may transfer vibrational energy (e.g., acoustic signals) generated by the transducer 225 from the finger structure 422 into an acoustic transmission media (e.g., a gas, a liquid, a solid) surrounding the finger structure 422. Alternatively or additionally, the foam material of the first foam layer 421A may be supple and/or flexible and allow the finger 220 to be placed in several positions and/or exert different forces on the object 230.

The finger 220 may further include a second foam layer 421B that may be disposed on an opposite side (e.g., back surface) of the finger structure 422 having the first foam layer 421A (e.g., normal surface). In an embodiment, the second foam layer 421B may include a foam material that is substantially similar and/or the same material included by the first foam layer 421A, and/or the second foam layer 421B may be attached to the finger structure 422 using a substantially similar and/or the same attachment method as the first foam layer 421A. However, the present disclosure is not limited in this regard. That is, the second foam layer 421B may include a foam material that is different from the foam material of the first foam layer 421A, and/or the second foam layer 421B may be attached to the finger structure 422 using a different attachment method than the first foam layer 421A. Similarly to the first foam layer 421A, the second foam layer 421B may transfer vibrational energy (e.g., acoustic signals) generated by the transducer 225 from the finger structure 422 into the acoustic transmission media (e.g., a gas, a liquid, a solid) surrounding the finger structure 422.

As described with reference to FIG. 2, the transducer 225 may be and/or include an acoustic transducer such as, but not limited to, a piezoelectric transducer, a ceramic transducer, a crystal transducer, a film transducer, a magnetostrictive transducer, a capacitive transducer, a magnetic coil (e.g., a speaker), and the like. In an embodiment, the transducer 225 may be configured to vibrate at a frequency substantially similar and/or the same frequency as the frequency of an applied electrical charge. Alternatively or additionally, the transducer 225 may be configured to generate an electrical signal (e.g., voltage, current, impedance, and the like) in response to an applied mechanical stress (e.g., incident acoustic reflections). In an optional or additional embodiment, assuming that the acoustic transducer 225 is a piezoelectric transducer, the piezoelectric material of the acoustic transducer 225 may include, but not be limited to, a lead zirconate titanate (PZT) piezoelectric crystal. In such embodiments, the piezoelectric material may be arranged in a single layer of material (e.g., configured to vibrate at a single frequency) and/or the piezoelectric material may include a stack of several layers of piezoelectric material that may be excited at separate frequencies (e.g., configured to vibrate at two or more frequency). That is, the transducer 225 may be and/or may include a PZT crystal transducer that may vibrate the finger 220 and create an acoustic aura 227 engulfing the finger 220.

Objects 230 in close proximity to the finger 220 that may enter the acoustic aura 227 may reflect acoustic energy (e.g., audio signals) back to the finger 220 that may be sensed by the same PZT crystal transducer that created the acoustic aura 227. For example, the transducer 225 may receive acoustic reflections from at least one of a top direction, a bottom direction, a front direction, a back direction, and a normal direction. That is, the transducer 225 may receive acoustic reflections from at least one surface of five (5) surfaces of a cuboid (e.g., the finger structure 422) that may exclude a side of the finger structure 422 that may be attached to the robot gripper.

In an embodiment, vibrational energy (e.g., acoustic signals) originating from the transducer 225 may be transferred from the transducer 225 to the finger structure 422, from the finger structure 422 to at least one of the first foam layer 421A and the second foam layer 421B, and from the foam layers 421A and 421B to the acoustic transmission media (e.g., a gas, a liquid, a solid) surrounding the finger 220. The transfer of the vibrational energy from one layer to a next layer may depend on the acoustic matching at each transition junction (e.g., transitions from transducer to foam layer, from transducer to acoustic layer, from acoustic layer to finger structure, from finger structure to foam layer, from foam layer to acoustic transmission media). As such, the transfer of the vibrational energy may be affected by physical characteristics of the finger structure 422 and/or the foam layers 421A and 421B, such as, but not limited to, size, thickness, material composition, vibration frequency, and the like. Consequently, design constraints imposed on the finger 220 may attempt to maximize the acoustic matching at each transition junction in order to potentially reduce acoustic signal losses. For example, according to design constraints and without departing from the scope of the present disclosure, the first and second foam layers 421A and 421B and/or the acoustic layer 423 may include a more complex structure that may include additional layers, patterns, holes, and/or inclusions that may be configured to optimize the transmission of acoustic energy between the transducer 225 and the acoustic transmission media. In such an example, techniques that may be typically used in optical systems for reducing reflections may also be applicable to the present disclosure.

Alternatively or additionally, a frequency of the electrical charge applied to the transducer 225 may be selected to minimize acoustic signal losses and/or maximize the range of the acoustic aura 227 and/or the detection of the reflected signals from the object 230. For example, the frequency may be selected based on physical characteristics of the finger structure 422 and/or the foam layers 421A and 421B. For another example, the frequency may be selected based on at least one of physical characteristics of the robot, transmission characteristics (e.g., speed, distortion, distance) of the frequency through the acoustic transmission media (e.g., a gas, a liquid, a solid), and positional accuracy requirements. In an embodiment, a chirp signal (e.g., a signal that changes frequency from a start frequency to an end frequency) may be used to excite the transducer 225 embedded in the finger 220 to determine a frequency that may maximize the acoustic matching of the finger 220, and as such, may minimize acoustic signal losses. For example, a monotone tone signal 315 having a frequency of 40 kHz at 18 $V_{rms}$ may be selected as an optimal frequency for sensing object proximity and/or contact with an object.

In an embodiment, the acoustic coupling of the transducer 225 to the finger 220 may change when the finger 220 comes into contact with the object 230. That is, the effective AC impedance 325 of the transducer 225 may change from a first state (e.g., not contacting the object 230) to a second state (e.g., contacting the object 230) when finger 220 comes into contact with the object 230. Alternatively or additionally, the effective AC impedance 325 of the transducer 225 may remain in the second state while the finger 220 remains in contact with the object 230. In an optional or additional embodiment, the effective AC impedance 325 of the transducer 225 may return to the first state when the finger 220 stops being in contact with the object 230. Thus, the finger 220 may be used to perform contact detection with the object 230 as described with reference to FIG. 9.

Figure 4B:
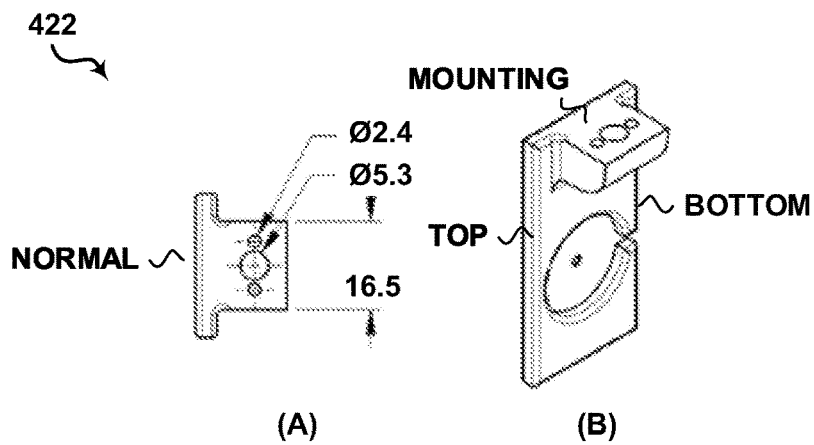
FIG. 4B illustrates orthographic and isometric projections of an example finger structure, in accordance with various aspects of the present disclosure.
Figure 4B:
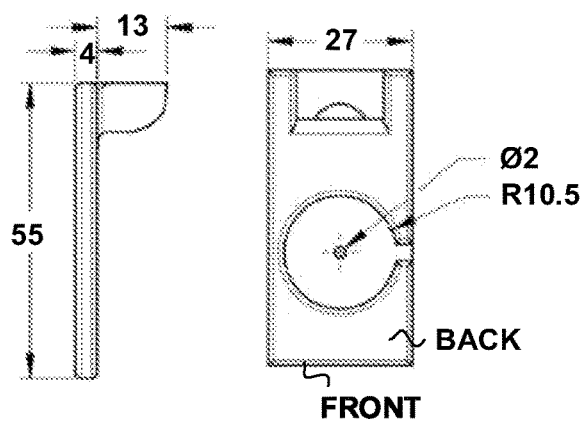

FIG. 4B illustrates orthographic and isometric projections of an example finger structure, in accordance with various aspects of the present disclosure. Referring to FIG. 4B, a finger structure 422 may have a size (e.g., dimensions) and shape similar to the structure depicted in (A) to (D) of FIG. 4B. Alternatively or additionally, the normal (or contact) side, the top side, the bottom side, the front side, and/or the back side of the finger structure 422 may refer to the sides indicated by (A) to (D) of FIG. 4B. However, the present disclosure is not limited in this regard. That is, in practice, the finger structure 422 may differ in shape, dimensions, and/or naming from the example finger structure depicted in FIG. 4B. For example, design constraints imposed on the finger 220 may cause the finger structure 422 to differ from FIG. 4B, without deviating from the scope of the present disclosure.

As shown in (A) of FIG. 4B, the finger structure 422 may have a mounting surface having a width of about 16.5 mm, and three mounting holes having diameters of about 2.4 mm, 5.3 mm, and 2.4 mm, respectively. For example, the mounting holes may be used to attach the finger structure 422 to the end-effector 210. Referring to (A) and (B) of FIG. 4B, the finger structure 422 may have a normal (or contact) side and top and bottom sides on opposing edges that are adjacent to the normal side. As shown in (C) and (D) of FIG. 4B, the finger structure 422 may have an overall length of about 55 mm, an overall width of about 27 mm, and an overall thickness of about 4 mm at the sensing and gripping area. A height of the mounting area of the finger structure 422 may be about 13 mm. Referring to (D) of FIG. 4B, the circular indentation disposed on the back surface of the finger structure 422 may have a radius of about 10.5 mm, and a 2 mm diameter sprue may be located in the center of the circular indentation. The front edge of the finger structure 422 may refer to the edge of the finger structure 422 that is opposite to the edge having the mounting area.

As described above, the finger 220, according to an embodiment, may be able to grab, pick, lift, and/or place the object 230 while protecting the transducer 225 embedded within the finger structure 422 from physical damage. Alternatively or additionally, the finger 220 may have a relatively compact size, may be deployed quickly using a single mounting screw, and may have a simple design that may be relatively simple to manufacture at a relatively low cost. Furthermore, the finger 220 may be constructed with materials that may be acoustically coupled to the transducer 225 that may transfer the vibrational energy (e.g., acoustic signals) generated by the transducer 225 to produce an acoustic aura 227.

Figure 5:
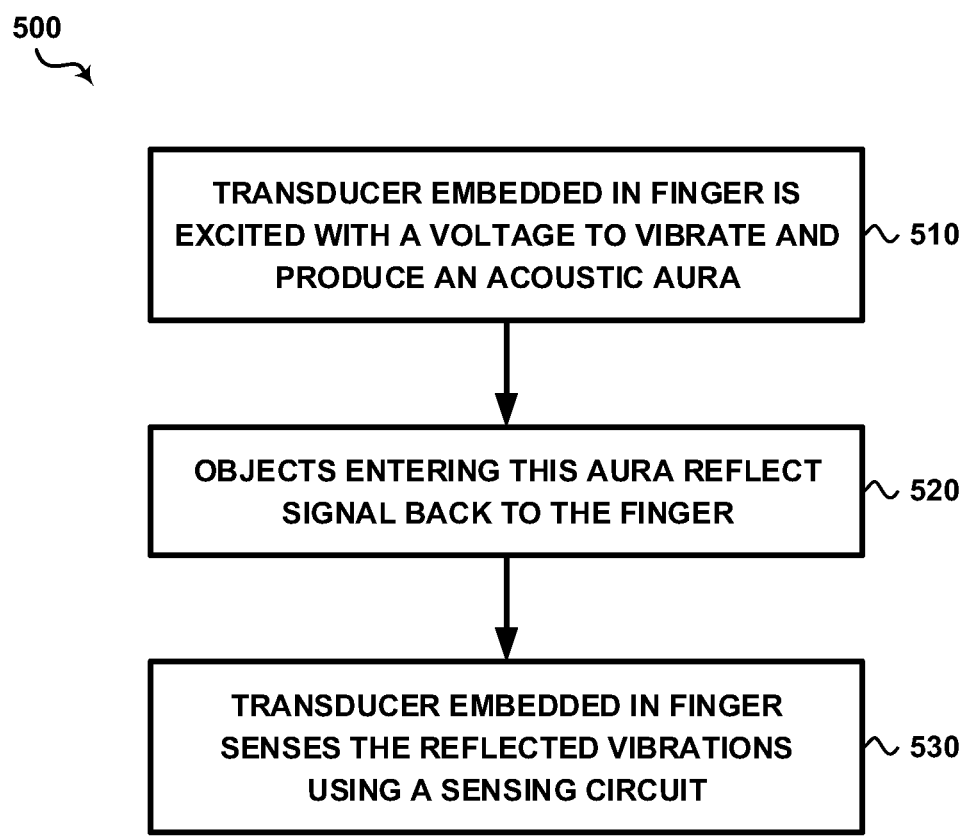
FIG. 5 illustrates a flowchart of an example process for performing reactive positioning by a finger, in accordance with various aspects of the present disclosure.

FIG. 5 illustrates a flowchart of an example process for performing reactive positioning by a finger, in accordance with various aspects of the present disclosure.

Referring to FIG. 5, a process 500 for performing reactive positioning by a device that implements one or more aspects of the disclosure is illustrated. In some embodiments, at least a portion of the operations and/or functions depicted by the process 500 may be performed by the device 100 of FIG. 1, which may include the reactive positioning component 180. Alternatively or additionally, another computing device (e.g., a robotic device, a robot controller, a server, a laptop, a smartphone, a UE, a wearable device, a smart device, an IoT device, and the like) that includes the reactive positioning component 180 may perform at least a portion of the process 500.

In some embodiments, the process 500 depicted in FIG. 5 may be used to implement at least a portion of at least one of the reactive positioning process 200 and the process flow 300 described with reference to FIGS. 2 and 3, and may include additional features not mentioned above.

In operation 510, the transducer 225 embedded in the finger 220 may be excited with a voltage (e.g., tone signal 315) to vibrate and produce an acoustic aura 227. For example, the transducer 225 may generate vibrational energy based on the tone signal 315, which may be transferred via the finger structure 422 and foam layers 421A and 421B to the acoustic transmission media (e.g., a gas, a liquid, a solid) surrounding the finger 220 to produce the acoustic aura 227. Alternatively or additionally, the transducer 225 may receive the tone signal 315 from the signal processing pipeline 330, as described with reference to FIG. 3. The tone signal 315 may be and/or may include an alternating voltage having a monotone frequency (e.g., 40 kHz) that may have been determined based on the size, shape, and/or material composition of the finger 220.

In operation 520, objects 230 entering the acoustic aura 227 may reflect an acoustic signal back to the finger 220. In operation 530, the transducer 225 embedded in the finger 220 may sense (e.g., receive) the reflected vibrations using a sensing circuit. For example, the sensing circuit may include a piezoelectric crystal configured to generate an electrical signal (e.g., voltage, current, impedance, and the like) in response to an applied mechanical stress (e.g., incident acoustic reflections). That is, the reflected vibrations that are incident on the piezoelectric crystal may cause an effective AC impedance of the transducer 225 to change according to an amount (e.g., total energy) of reflected acoustic signals received by the transducer 225.

Figure 6A:
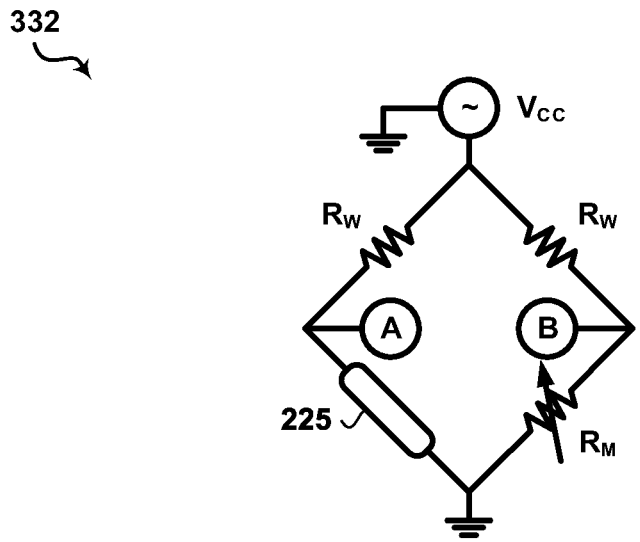
FIG. 6A depicts an example of an impedance measurement circuit for processing a reflected signal, in accordance with various aspects of the present disclosure.

FIG. 6A depicts an example of an impedance measurement circuit for processing a reflected signal, in accordance with various aspects of the present disclosure. FIG. 6B depicts an example of a coherent detection circuit for processing a reflected signal, in accordance with various aspects of the present disclosure Referring to FIGS. 3, 6A, and 6B, the impedance measurement component 332 may be and/or may include an impedance measurement circuit as depicted in FIG. 6A, and the coherent detection component 334 may be and/or may include a coherent detection circuit as depicted in FIG. 6B.

The impedance measurement circuit 332 may be and/or may include a balancing circuit, such as, but not limited to a Wheatstone bridge circuit. The balancing circuit may be used to detect low-amplitude reflected signals that may be mixed with a larger amplitude transmission signal. That is, when the transducer is operating in the full-duplex mode, the low-amplitude reflected signals that may correspond to the reflected acoustic signals incident on the transducer 225 may be mixed with the tone signal 315. For example, the voltage signals 333 received from the transducer 225 may include a copy of the tone signal 315, in addition to the low-amplitude reflected signals.

As used herein, a balancing circuit (e.g., a Wheatstone bridge) may refer to performing a null measurement technique on a circuit containing two voltage dividers form two arms of a bridge that may be excited using a common source voltage. The voltage difference across the two arms (e.g., A and B) may be considered as the output voltage of the balancing circuit. For example, when the voltage across both the arms is the same, the balancing circuit may be said to be balanced and may produce an output voltage of zero (0) volts (e.g., (A−B)=0 V). Alternatively or additionally, a relatively small voltage change in either arm may result in the bridge going out of balance, which may be indicated by (A−B)≠0 V.

As shown in FIG. 6A, a measurement may be made with the voltage of one arm (e.g., A) varying with respect to a static reference voltage on the other arm (e.g., B). In an embodiment, the impedance measurement circuit 332 may use a resistor $R_W$ in series with the transducer 225 embedded inside a finger 220 for the variable arm of the bridge. For example, the resistor $R_W$ may have a resistance of about 2.2 kilo-Ohms (kΩ), but the present disclosure is not limited in this regard. Alternatively or additionally, the impedance measurement circuit 332 may use, for the reference arm of the bridge circuit, another resistor $R_W$ in series with a matched impedance $R_M$ that may be substantially similar and/or the same as the impedance of the transducer 225. As such, the impedance measurement circuit 332 may be used to measure changes to the effective AC impedance of the transducer 225 that may be caused by acoustic reflections from the object 230 that may be incident on the transducer 225. That is, the impedance measurement component 332 may measure small changes in the effective AC impedance of the transducer 225 when the impedance of the transducer 225 matches the matched impedance $R_M$.

In an embodiment, the effective impedance of the transducer 225 may be a complex impedance (e.g., may include amplitude and phase components, in addition to resistance). Consequently, the effective impedance of the matched impedance $R_M$ may need to be a complex impedance. As such, in practice, the matched impedance $R_M$ may be and/or may include a circuit composed of a combination of electrical elements (e.g., resistors, capacitors, inductors, amplifiers, and the like) that may have a substantially similar and/or the same impedance as the transducer 225. Alternatively or additionally, the electrical elements may be adjustable in order to allow for precision matching the effective impedance of the transducer 225. In another example, the matched impedance $R_M$ may be and/or may include another transducer that is substantially similar and/or the same as transducer 225 but that is not exposed to the acoustic energy. In an optional or additional embodiment, the resistor $R_W$ may be and/or include a circuit composed of a combination of electrical elements and/or a transducer in a manner similar to matched impedance $R_M$.

The impedance measurement circuit 332 may convert the impedance changes of the transducer 225 to voltage signals 333 (e.g., a voltage across A and B) by comparing the impedance of the transducer 225 to the impedance of the matched impedance $R_M$. The output from each of the arms A and B of the impedance measurement circuit 332 may be fed to the coherent detection circuit 334.

Figure 6B:
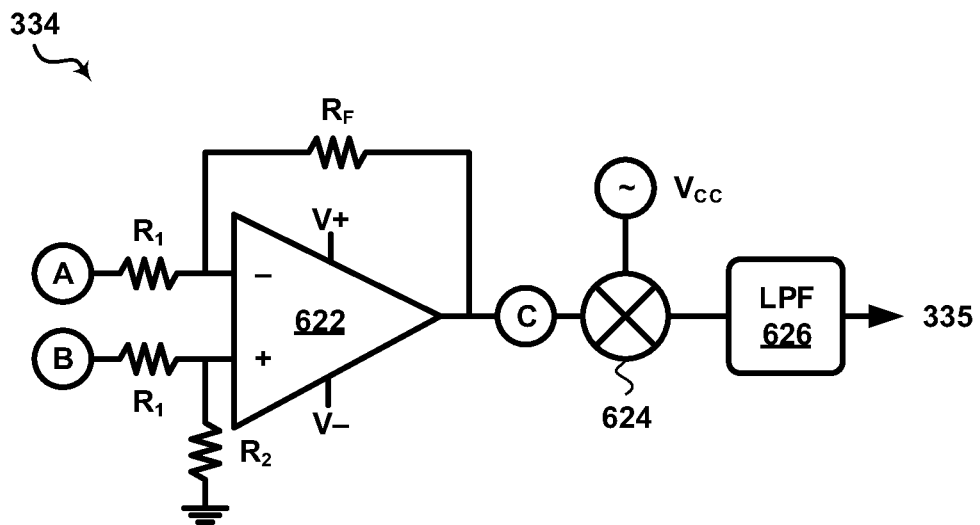
FIG. 6B depicts an example of a coherent detection circuit for processing a reflected signal, in accordance with various aspects of the present disclosure.

As shown in FIG. 6B, the output from each of the arms A and B of the impedance measurement circuit 332 may be fed to the inverting (e.g., "−") and the non-inverting (e.g., "+") terminals of a differential amplifier 622. The differential amplifier 622 may perform and output a subtraction of the two input signals (e.g., A−B). That is, the differential amplifier 622 may remove the high-amplitude transmitted signal (e.g., tone signal 315) that may be common to both terminals (e.g., arms A and B) and leave behind the low-amplitude reflected signal, which may be represented as C in FIG. 6B. In an embodiment, the output of the differential amplifier 622 (e.g., C=A−B) may be and/or may include a signal at the transmitted frequency (e.g., frequency of tone signal 315) with the proximity information 325 (e.g., impedance changes of transducer 225) appearing as undulations in the received signal. In an optional or additional embodiment, a primary winding of a transformer (not shown) may be connected to the arms A and B of the impedance measurement circuit 332 and a second winding of the transformer may be connected to a single-ended amplifier and an analog-to-digital converter (ADC).

Continuing to refer to FIG. 6B, the proximity information 325 may be extracted from the signal C by performing signal mixing and low-pass filtering on the signal C. For example, a signal mixer 624 may be used to multiply the output of the differential amplifier 622 with an in-phase copy of the transmitted signal (e.g., tone signal 315). The multiplication (e.g., signal mixing) may result in a proximity signal 335 proportional to undulations of the received signal and a high frequency term (e.g., second-order harmonics of the transmitted signal). Thus, the output of the signal mixer 624 may be fed to a low-pass filter 626 to remove the high-frequency components from the output of the signal mixer 624, resulting in the proximity signal 335.

In an embodiment, the R 1 resistors of the coherent detection circuit 334 may have an impedance of about 2.2 kΩ, and the $R_2$ and $R_f$ resistors may each have an impedance of about 100 kΩ. However, the present disclosure is not limited in this regard, and the coherent detection circuit 334 may have resistors having other impedance values.

Figure 7:
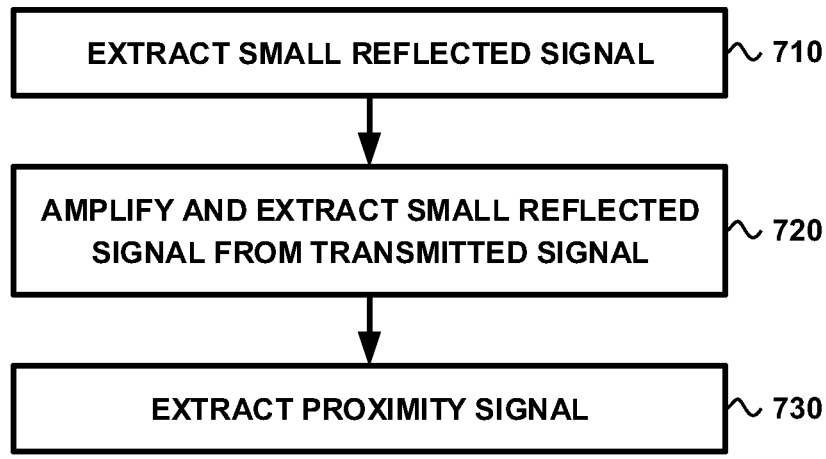
FIG. 7 illustrates a flowchart of an example process for processing a reflected signal, in accordance with various aspects of the present disclosure.

FIG. 7 illustrates a flowchart of an example process for processing a reflected signal, in accordance with various aspects of the present disclosure.

Referring to FIG. 7, a process 700 for processing a reflected signal that implements one or more aspects of the disclosure is illustrated. In some embodiments, at least a portion of the operations and/or functions depicted by the process 700 may be performed by the impedance measurement circuit 332 and/or the coherent detection circuit 334 depicted in FIGS. 6A and 6B, respectively.

In some embodiments, the process 700 depicted in FIG. 7 may be used to implement at least a portion of at least one of the reactive positioning process 200 and the process flow 300 described with reference to FIGS. 2 and 3, and may include additional features not mentioned above.

In operation 710, an impedance measurement circuit 332 (e.g., a Wheatstone bridge circuit) of the signal processing pipeline 330 may extract a small (e.g., low-amplitude) reflected signal from the effective impedance 325 of the transducer 225. For example, the impedance measurement circuit 332 may convert impedance changes of the transducer 225 that may be caused by acoustic reflections of vibrational energy from the object 230 into voltage signals (e.g., arms A and B of FIG. 6A).

In operation 720, a coherent detection circuit 334 of the signal processing pipeline 330 may amplify and extract the small (e.g., low-amplitude) reflected signal from the high-amplitude transmitted signal (e.g., tone signal 315). For example, the coherent detection circuit 334 may subtract a reference voltage signal (e.g., arm B of FIG. 6A) of the impedance measurement circuit 332 from a variable voltage signal (e.g., arm A of FIG. 6A) to remove the transmitted signal. Thus, the coherent detection circuit 334 may extract from the voltage signals, outputted by the impedance measurement circuit 332, an interference signal comprising a low amplitude signal corresponding to the received acoustic reflections.

In operation 730, the coherent detection circuit 334 may extract the proximity signal 335 from the interference signal. For example, the coherent detection circuit 334 may mix the interference signal with an in-phase copy of the transmitted signal (e.g., tone signal 315) and perform low-pass filtering of the mixed signal to generate the proximity signal 335, as described with reference to FIG. 6B. That is, the coherent detection circuit 334 may mix the amplified interference signal with an in-phase copy of the input signal resulting in a DC signal proportional to undulations of the voltage signals 333.

Alternatively or additionally, the playback and acquisition component 336 may be configured to generate reflection data 338 by performing ADC of the proximity signal 335, as described with reference to FIG. 3.

Figure 8:
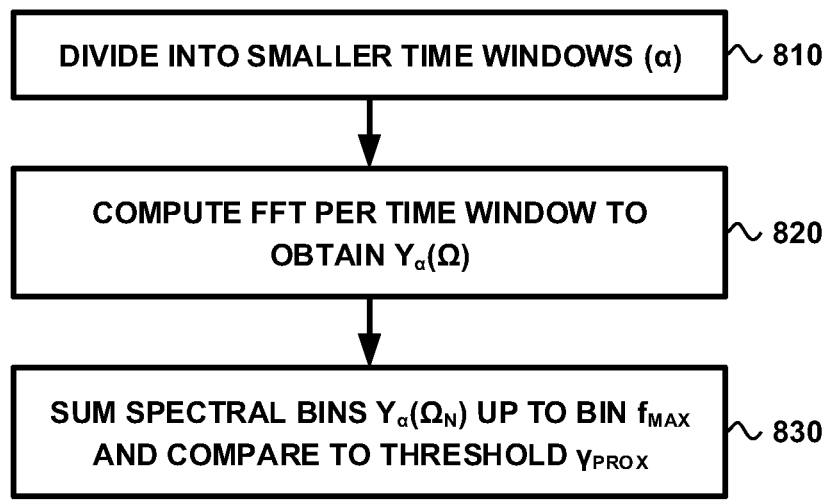
FIG. 8 depicts a flowchart of an example proximity detection process, in accordance with various aspects of the present disclosure.

FIG. 8 depicts a flowchart of an example proximity detection process, in accordance with various aspects of the present disclosure.

Referring to FIG. 8, a proximity detection process 800 for detecting an object 230 by a device that implements one or more aspects of the disclosure is illustrated. In some embodiments, at least a portion of the operations and/or functions depicted by the proximity detection process 800 may be performed by the device 100 of FIG. 1, which may include the reactive positioning component 180 and/or the proximity detection component 342 of FIG. 3. Alternatively or additionally, another computing device (e.g., a robotic device, a robot controller, a server, a laptop, a smartphone, a UE, a wearable device, a smart device, an IoT device, and the like) that includes the reactive positioning component 180 and/or the proximity detection component 342 of FIG. 3 may perform at least a portion of the proximity detection process 800.

In some embodiments, the proximity detection process 800 depicted in FIG. 8 may be used to implement at least a portion of at least one of the reactive positioning process 200 and the process flow 300 described with reference to FIGS. 2 and 3, and may include additional features not mentioned above.

As described above with reference to FIGS. 2 and 3, an end-effector 210 of a robot may be equipped with one or more fingers 220 and may be moved towards an object 230, thus making the object 230 enter the acoustic auras 227 of the one or more fingers 220. In another example, the end-effector 210 of the robot may retreat (e.g., move away) from the object 230, thus making the object 230 exit the acoustic auras 227 of the one or more fingers 220. In yet another example, the end-effector 210 of the robot monitor a distance to the object 230, thus making the one or more fingers 220 maintain a relative distance to the object 230.

Acoustic waves generated by the transducers 225 of the one or more fingers 220 may be reflected off the object 230. The transducers 225 may sense (e.g., detect) the reflected acoustic waves that may be incident on the transducer 225. The reflected signals may interfere with the transmitted signals and may appear as undulations in the voltage signals 333 generated from the output of the transducers 225.

The undulations in the voltage signals 333 may be independent of the speed at which the end-effector 210 is approaching the object 230, and may represent nodes at a specific distance as the robot approaches the object. That is, the number of undulations in the voltage signals 333 may be the same when the end-effector 210 is approaching the object 230 at a first speed and at a second speed different from the first speed.

Alternatively or additionally, the amount (e.g., signal amplitude, signal magnitude) and/or the phase of reflected signals that are incident to the transducer 225 may be a function at least one of the position of the object 230, a velocity of the object 230, a shape of the object 230, mechanical properties of the object 230, and a size of the object 230. For example, as the object 230 moves closer to the finger 220, a greater amount of reflected signals may be incident on the transducer 225 and/or a phase of the reflected signals may be affected, which may increase the amplitude of the interference and/or undulations in the voltage signals 333.

In an embodiment, the velocity of the object 230 may affect the rate (e.g., frequency) at which the amplitude of the reflected signal oscillates. That is, the amplitude of the reflected signal may oscillate as the distance between the object 230 and the finger 220 changes. For example, a fast moving object may create closely spaced undulations. For another example, a slower moving object may create a same number of undulations that are spaced farther apart than the fast moving object.

Therefore, the proximity of an object may be detected by monitoring the amplitude and the quantity of undulations in the voltage signals 333. Furthermore, robot motion and/or signals other than proximity signals may appear as noise, in that the spectral power of these signals may be spread out over various frequencies. Whereas, the undulations may have low frequencies (e.g., under 100 Hz) when an object 230 is in the vicinity (e.g., proximate) of the finger 220. Hence, a threshold based on a summed spectral power may be used to identify a characteristic proximity pattern in real-time, according to the present disclosure.

Referring to FIG. 8, in operation 810, an undulation signal, y(t), may be divided into time windows that may have a length of a seconds. In operation 820, a Fast Fourier Transform (FFT) may be computed for each time window to obtain spectral information $Y_\alpha(\Omega)$ that may be present in each time window $y_\alpha(t)$. The Fourier Transform may be represented as an equation similar to Eq. 1.

$$Y(\Omega) = \int_{-\infty}^{\infty} y(t)e^{-i2\pi\Omega t}dt, \forall\, \Omega \in \mathbb{R} \quad [\text{Eq. 1}]$$

Referring to Eq. 1, the Fourier Transform may decompose the time domain signal y(t) into its constituent frequency components and provide a magnitude of each frequency present in the waveform. As discussed above, frequencies less than 100 Hz may have higher magnitudes compared to other frequencies when a proximity pattern exists.

In operation 830, spectral bins $Y_\alpha(\Omega_n)$ may be summed up to bin $f_{max}$ (e.g., 100 Hz) and compared to threshold $\gamma_{prox}$ to detect whether the object 230 is proximate to the finger 220. The summation of the spectral bins may be represented as an equation similar to Eq. 2, and the comparison may be represented as an equation similar to Eq. 3.

$$\mathcal{P} = \sum_{n=1}^{f_{max}} y_\alpha(\Omega_n) \quad [\text{Eq. 2}]$$

$$\text{Proximity} = \begin{cases} 1, & \mathcal{P} > \gamma_{prox} \\ 0, & \text{otherwise.} \end{cases} \quad [\text{Eq. 3}]$$

Referring to Eqs. 2 and 3, spectral powers between zero (0) and $f_{max}$ (e.g., 100 Hz) may be summed and compared to a heuristic threshold $\gamma_{prox}$. If the summed spectral power $\mathcal{P}$ is greater than the threshold $\gamma_{prox}$, a proximity event is detected. A proximity calibration process 1000 described with respect to FIG. 10 may be used to determine the values of the frequency limit $f_{max}$ and the threshold $\gamma_{prox}$.

As described herein, the proximity detection process 800 may be used to determine proximity of the end-effector 210 to the object 230 as the end-effector 210 approaches the object 230 (e.g., prior to contacting the object 230), as the end-effector 210 retreats from the object 230 (e.g., after contacting the object 230), and/or as the end effector 210 maintains a fixed distance to the object 230.

In an embodiment, a grasp positioning process for positioning the end-effector 210 with respect to the object 230 may be performed by the device 100 of FIG. 1, which may include the reactive positioning component 180 and/or the grasp positioning component 344 of FIG. 3. Alternatively or additionally, another computing device (e.g., a robotic device, a robot controller, a server, a laptop, a smartphone, a UE, a wearable device, a smart device, an IoT device, and the like) that includes the reactive positioning component 180 and/or the grasp positioning component 344 of FIG. 3 may perform at least a portion of the grasp positioning process.

In some embodiments, the grasp positioning process may be used to implement at least a portion of at least one of the reactive positioning process 200 and the process flow 300 described with reference to FIGS. 2 and 3, and may include additional features not mentioned above.

The grasp positioning process may include instructing the end-effector 210 of the robot to move along an axis perpendicular to the object 230. The grasp positioning process may further include, when, based on the reflection data 338, the object 230 has been detected by at least one finger 220 of the one or more fingers 220, saving a current position of the end-effector 210 of the robot as a first position. The grasp positioning process may further include instructing the end-effector 210 of the robot to move at least one other finger 220 opposite to the at least one finger 220 towards the object 230. The grasp positioning process may further include, when, based on the reflection data 338, the at least one other finger 220 has detected the object 230, save the current position of the end-effector 210 of the robot as a second position. The grasp positioning process may further include computing a desired grasp position based on the first position and the second position.

As discussed above, reflection data 338 from two or more fingers 220, which may be deployed in an end-effector 210 of a robot, may be compared to estimate the position of an object 230 present in between the two or more fingers 220. For example, a stronger proximity signal 335 may be sensed (e.g., detected) from the finger 220 that may be closest (e.g., nearest) to the object 230. To perform grasp positioning, the robot may move the end-effector 210 along a single axis that may be perpendicular to the object 230. When the object 230 is detected by a finger 220, the end-effector position is saved and the velocity of the end-effector 210 is changed to move the opposite finger 220 towards the object 230 until the second (opposite) finger 220 detects the object 230. When the second finger 220 detects the object 230, the position of the end-effector is saved.

The two detection locations may be used to determine a path to move the end-effector 210 to the desired position with respect to the object 230. The desired position may refer to a position that may maximize the probability of a successful grasp of the object 230 by the end-effector 210. When the desired position is at the center of the two or more fingers, an average of the two detection locations may be computed and/or the end-effector 210 may be moved to the middle of both positions, thus centering the object 230 using only the proximity information (e.g., prior to contact and/or after contact). However, the present disclosure is not limited in this regard. That is, the grasp positioning process may be used to position the end-effector 210 at positions other than the center position with respect to the object 230.

In an embodiment, a contact detection process for detecting contact of the end-effector 210 with the object 230 may be performed by the device 100 of FIG. 1, which may include the reactive positioning component 180 and/or the contact detection component 346 of FIG. 3. Alternatively or additionally, another computing device (e.g., a robotic device, a robot controller, a server, a laptop, a smartphone, a UE, a wearable device, a smart device, an IoT device, and the like) that includes the reactive positioning component 180 and/or the contact detection component 346 of FIG. 3 may perform at least a portion of the contact detection process.

In some embodiments, the contact detection process may be used to implement at least a portion of at least one of the reactive positioning process 200 and the process flow 300 described with reference to FIGS. 2 and 3, and may include additional features not mentioned above.

As discussed above, a characteristic proximity pattern may be observed as a finger 220 approaches an object 230, prior to contacting the object 230. When the finger 220 comes into contact with the object 230, a sharp level change may be detected, which may remain while the contact with the object 230 is maintained using the same force. For example, prior to the contact, the characteristic proximity pattern may be passed on a combination of the finger 220 and the transducer 225 that may be embedded within the finger and acoustically coupled to the finger 220. When the finger 220 comes into contact with the object 230, the object 230 may become acoustically coupled to the finger 220 and the transducer 225, which may cause the sharp level change. As described above, voltage signals 333 may change based on the effective impedance of the transducer 225 that may drastically change when the combined coupling of the finger 220 and the transducer 225 makes contact with the object 230. FIG. 9 illustrates examples of responses from a transducer when a finger comes into contact with an object, in accordance with various aspects of the present disclosure.

Figure 9:
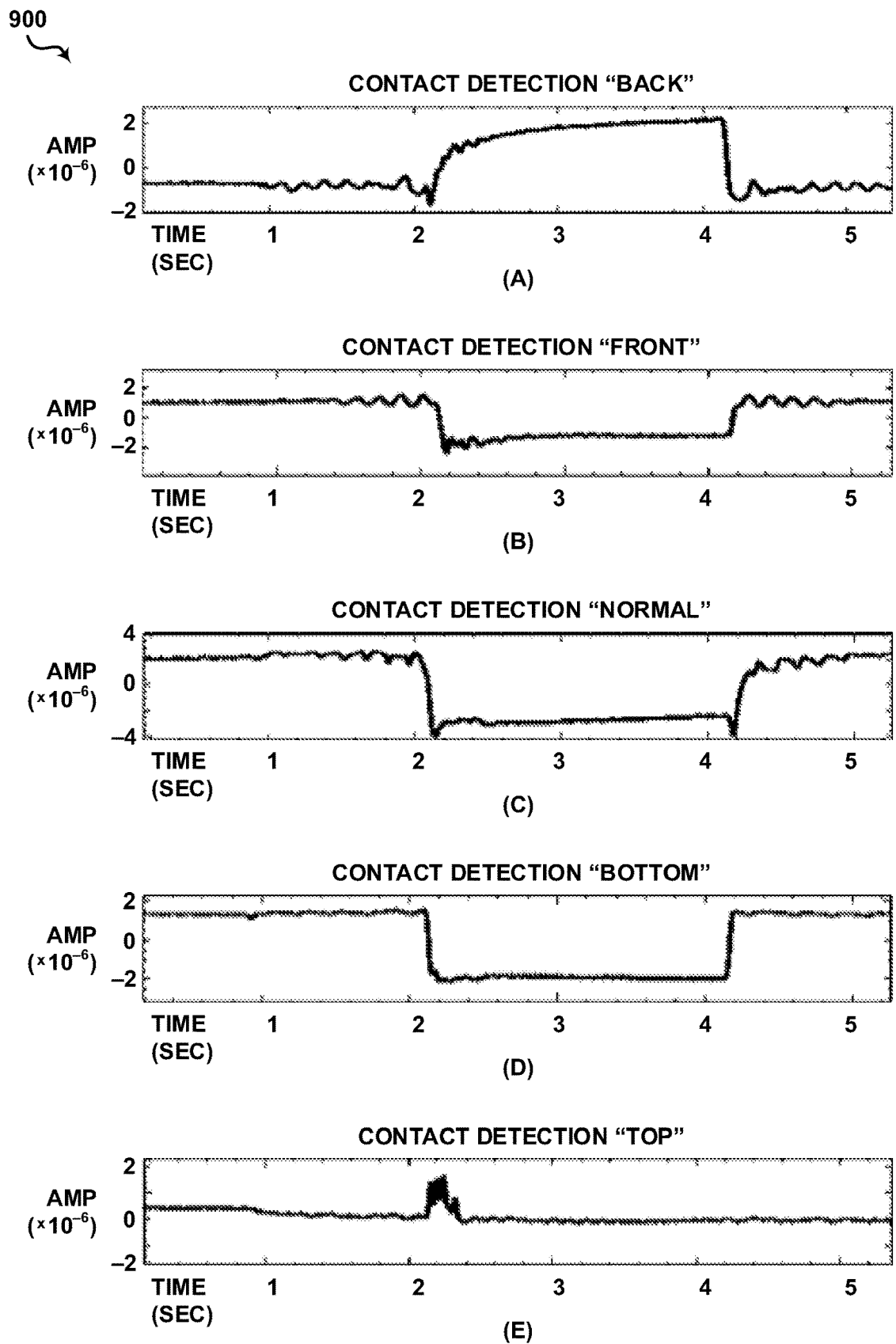
FIG. 9 illustrates examples of responses from a transducer when a finger comes into contact with an object, in accordance with various aspects of the present disclosure

Referring to FIG. 9, (A) shows an example of a signal response when the object 230 comes into contact with the back side of the finger 220, (B) shows an example of a signal response when the object 230 comes into contact with the front edge of the finger 220, (C) shows an example of a signal response when the object 230 comes into contact with the normal side of the finger 220, (D) shows an example of a signal response when the object 230 comes into contact with the bottom edge of the finger 220, and (E) shows an example of a signal response when the object 230 comes into contact with the top edge of the finger 220. Alternatively or additionally, a short rise and fall may occur just prior to the signal stabilizing to a level change. The short rise and fall may be caused by the end-effector 210 reaching a constant applied force, as shown in (C) of FIG. 9. The short rise and fall may be caused by the end-effector 210 reaching a constant applied force.

When the finger 220 stops contacting the object 230 (e.g., is no longer contacting the object 230), another sharp level change may return the proximity signal 335 back to a substantially similar and/or the same level prior to the contact, as shown in FIG. 9. Therefore, the contact detection process may be able to detect when finger 220 and the object 230 come into contact, and when the finger 220 and the object 230 may no longer be in contact with each other.

The contact detection process may include computing a z-score (e.g., standard score) to detect signal level changes of the undulation signal, y(t), that indicate a contact condition. As used herein, a z-score may refer to a statistical measure that may indicate how far away a data point is from the remainder of the data, and/or how many standard deviations away from the mean is a given observation. The z-score $z_{score}$ may be represented as an equation similar to Eq. 4, and the contact determination may be represented as an equation similar to Eq. 5.

$$z_{score}(n) = \frac{y(n) - \text{mean}(y)}{std(y)} \quad [\text{Eq. 4}]$$

-continued $$\text{Contact} = \begin{cases} 1, & |z_{score}(n)| > \gamma_{contact} \\ 0, & \text{otherwise.} \end{cases} \quad [\text{Eq. 5}]$$

Referring to Eq. 4, y(n) may represent the next incoming processed sample, mean(y) may represent the mean value of the undulating signal y(t), and std(y) may represent the standard deviation of the undulating signal y(t). Referring to Eq. 5, contact with the object 230 may be determined to have occurred when the absolute value of the $z_{score}$ is greater than a heuristic threshold $\gamma_{contact}$. A contact calibration process 1100 described with respect to FIG. 11 may be used to determine the value of the threshold $\gamma_{contact}$.

Figure 10:
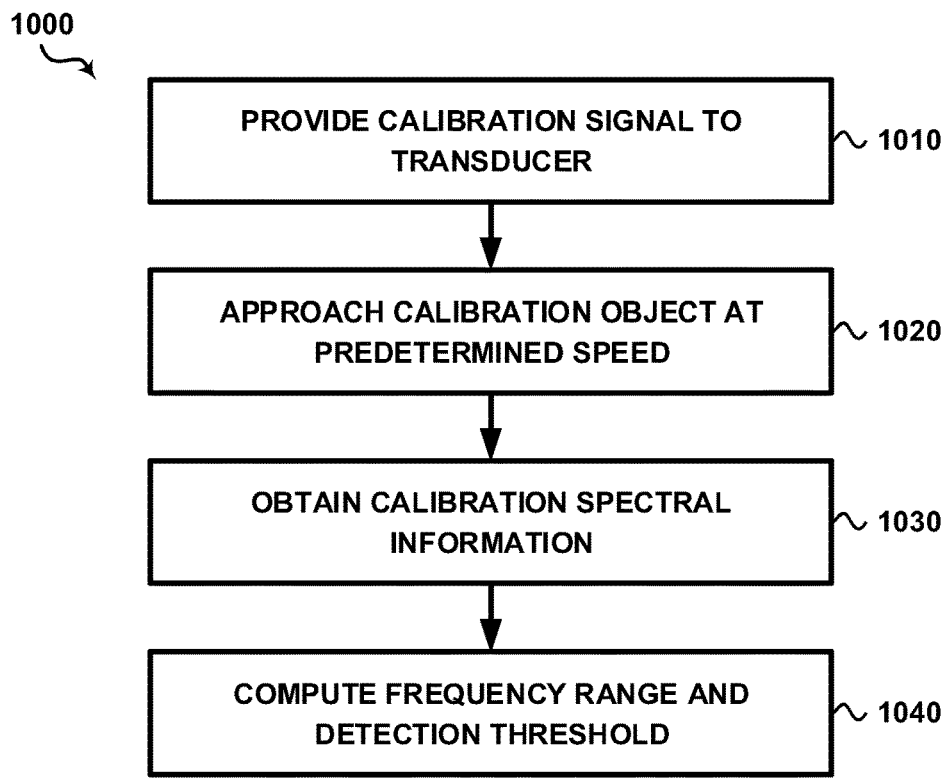
FIG. 10 depicts a flowchart of an example proximity calibration process, in accordance with various aspects of the present disclosure.

FIG. 10 depicts a flowchart of an example proximity calibration process, in accordance with various aspects of the present disclosure.

Referring to FIG. 10, a proximity calibration process 1000 for calibrating the proximity detection process 800 of FIG. 8 by a device that implements one or more aspects of the disclosure is illustrated. In some embodiments, at least a portion of the operations and/or functions depicted by the proximity calibration process 1000 may be performed by the device 100 of FIG. 1, which may include the reactive positioning component 180 and/or the proximity detection component 342 of FIG. 3. Alternatively or additionally, another computing device (e.g., a robotic device, a robot controller, a server, a laptop, a smartphone, a UE, a wearable device, a smart device, an IoT device, and the like) that includes the reactive positioning component 180 and/or the proximity detection component 342 of FIG. 3 may perform at least a portion of the proximity calibration process 1000.

In some embodiments, the proximity calibration process 1000 depicted in FIG. 10 may be used to implement at least a portion of at least one of the reactive positioning process 200 and the process flow 300 described with reference to FIGS. 2 and 3, and may include additional features not mentioned above.

In operation 1010, the one or more fingers 220 may be provided with a calibration signal. For example, the calibration signal may be and/or may include a chirp signal (e.g., a signal that changes frequency from a start frequency to an end frequency).

In operation 1020, the end-effector 210 may be instructed to approach a calibration object (e.g., object 230) at a predetermined speed.

In operation 1030, the proximity calibration process 1000 may include obtaining calibration spectral information. For example, a Fast Fourier Transform (FFT) may be computed for each time window to obtain calibration spectral information $Y_\alpha(\Omega)$ that may be present in each time window $y_\alpha(t)$, as described above with reference to operations 810 and 820 of FIG. 8.

In operation 1040, the proximity calibration process 1000 may include computing a frequency range (e.g., $f_{max}$) and a detection threshold (e.g., $\gamma_{prox}$). For example, frequency limit $f_{max}$ may be determined by finding the highest frequency present in the calibration spectral information $Y_\alpha(\Omega)$, and setting $f_{max}$ to a frequency value above the highest detected frequency. For another example, detection threshold $\gamma_{prox}$ may be calculated to be equal to the sum of the spectral bins $Y_\alpha(\Omega_n)$ up to bin $f_{max}$, similar to Eq. 2 described above with respect to FIG. 8. However, the present disclosure is not limited in this regard. That is, the frequency limit $f_{max}$ and/or the detection threshold $\gamma_{prox}$ may calculated using other processes without deviating from the scope of the present disclosure.

Figure 11:
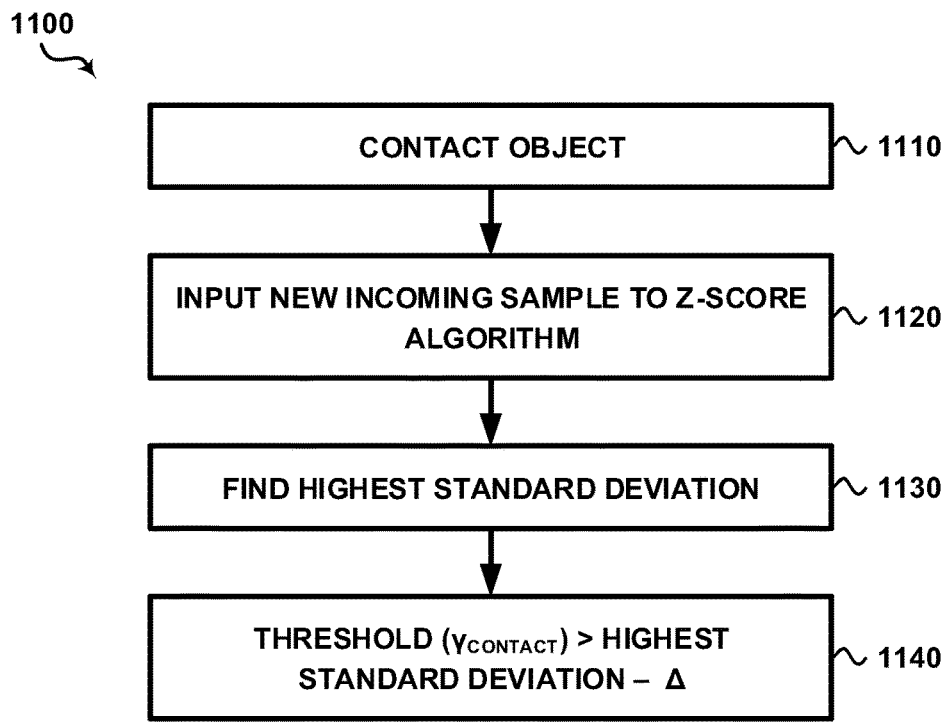
FIG. 11 illustrates a flowchart of an example contact calibration process, in accordance with various aspects of the present disclosure.

FIG. 11 illustrates a flowchart of an example contact calibration process, in accordance with various aspects of the present disclosure.

Referring to FIG. 11, a contact calibration process 1100 for calibrating the contact detection process by a device that implements one or more aspects of the disclosure is illustrated. In some embodiments, at least a portion of the operations and/or functions depicted by the contact calibration process 1100 may be performed by the device 100 of FIG. 1, which may include the reactive positioning component 180 and/or the contact detection component 346 of FIG. 3. Alternatively or additionally, another computing device (e.g., a robotic device, a robot controller, a server, a laptop, a smartphone, a UE, a wearable device, a smart device, an IoT device, and the like) that includes the reactive positioning component 180 and/or the contact detection component 346 of FIG. 3 may perform at least a portion of the contact calibration process 1100.

In some embodiments, the contact calibration process 1100 depicted in FIG. 11 may be used to implement at least a portion of at least one of the reactive positioning process 200 and the process flow 300 described with reference to FIGS. 2 and 3, and may include additional features not mentioned above.

In operation 1110, the end-effector 210 equipped with the one or more fingers 220 may be brought into contact with a calibration object (e.g., object 230).

In operation 1120, the contact calibration process 1100 may include inputting a new incoming sample to a z-score algorithm. For example, the new incoming sample may be provided to the contact calibration process described with reference to FIG. 9.

In operation 1130, the contact calibration process 1100 may include finding a highest (e.g., largest) standard deviation of the processing signal 335 computed during the contact calibration process 1100.

In operation 1140, the contact calibration process 1100 may include determining the contact threshold $\gamma_{contact}$ as a value greater (e.g., higher) than the highest standard deviation calculated in operation 1130 minus a delta $\Delta$ value. The delta $\Delta$ value may be determined to be a value sufficient to reduce and/or potentially avoid incorrectly determining that a contact condition has occurred (e.g., false positives).

Advantageously, the reactive positioning devices and processes, described above with reference to FIGS. 2 to 11, may provide for a low-cost, compact, easy to manufacture, and deploy finger that may contain a single acoustic transducer used to create an aura around the finger and sense changes in reflected signals. Alternatively or additionally, a balanced detection circuit and/or a coherent detection pipeline may be used to extract small changes in the reflected signals that may be provided to algorithms that may perform pre-touch/post-touch proximity detection, grasp positioning, and/or contact detection. That is, aspects presented herein provide a pre-grasp and contact sensor for pre-grasp sensing that may perform full-surface proximity detection without optical occlusions and that may be independent of the optical properties of the object.

Figure 12:
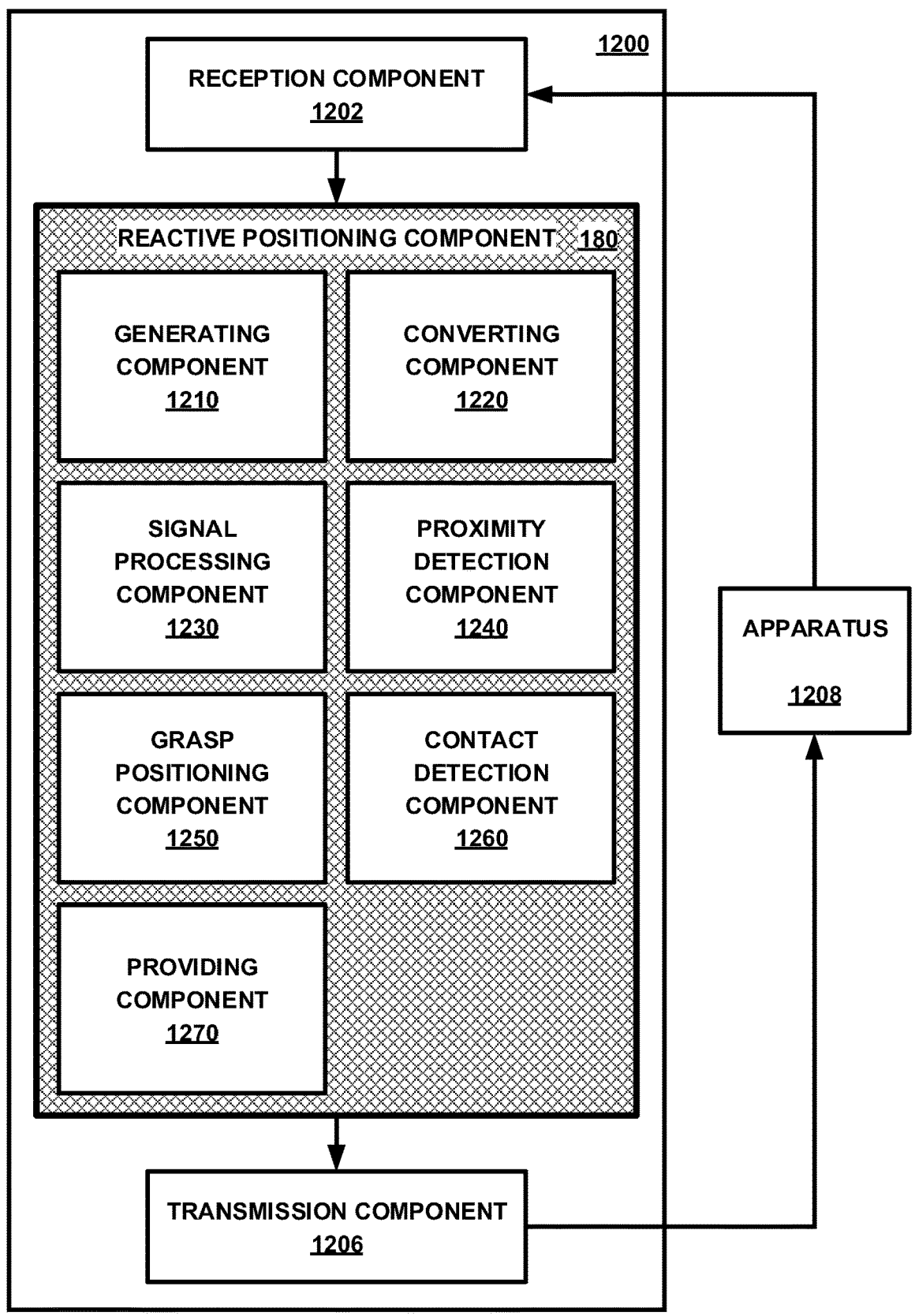
FIG. 12 depicts a block diagram of an example apparatus for performing reactive positioning by a device, in accordance with various aspects of the present disclosure.

FIG. 12 illustrates a block diagram of an example apparatus for performing reactive positioning by a device, in accordance with various aspects of the present disclosure. The apparatus 1200 may be a computing device (e.g., device 100 of FIG. 1) and/or a computing device may include the apparatus 1200. In some embodiments, the apparatus 1200 may include a reception component 1202 configured to receive communications (e.g., wired, wireless) from another apparatus (e.g., apparatus 1208), a reactive positioning component 180 configured to perform pre-touch/post-touch proximity detection, grasp positioning, and/or contact sensing for reactive positioning, and a transmission component 1206 configured to transmit communications (e.g., wired, wireless) to another apparatus (e.g., apparatus 1208). The components of the apparatus 1200 may be in communication with one another (e.g., via one or more buses or electrical connections). As shown in FIG. 12, the apparatus 1200 may be in communication with another apparatus 1208 (such as, but not limited to, a robotic device, a robot controller, a server, a laptop, a smartphone, a UE, a wearable device, a smart device, an IoT device, and the like) using the reception component 1202 and/or the transmission component 1206.

In some embodiments, the apparatus 1200 may be configured to perform one or more operations described herein in connection with FIGS. 1 to 11. Alternatively or additionally, the apparatus 1200 may be configured to perform one or more processes described herein, such as method 1300 of FIG. 13. In some embodiments, the apparatus 1200 may include one or more components of the device 100 described above in connection with FIG. 1.

The reception component 1202 may receive communications, such as control information, data communications, or a combination thereof, from the apparatus 1208 (e.g., a robotic device, a robot controller, a server, a laptop, a smartphone, a UE, a wearable device, a smart device, an IoT device, and the like). The reception component 1202 may provide received communications to one or more other components of the apparatus 1200, such as the reactive positioning component 180. In some embodiments, the reception component 1202 may perform signal processing on the received communications, and may provide the processed signals to the one or more other components. In some embodiments, the reception component 1202 may include one or more antennas, a receive processor, a controller/processor, a memory, or a combination thereof, of the device 100 described above with reference to FIG. 1.

The transmission component 1206 may transmit communications, such as control information, data communications, or a combination thereof, to the apparatus 1208 (e.g., a robotic device, a robot controller, a server, a laptop, a smartphone, a UE, a wearable device, a smart device, an IoT device, and the like). In some embodiments, the reactive positioning component 180 may generate communications and may transmit the generated communications to the transmission component 1206 for transmission to the apparatus 1208. In some embodiments, the transmission component 1206 may perform signal processing on the generated communications, and may transmit the processed signals to the apparatus 1208. In other embodiments, the transmission component 1206 may include one or more antennas, a transmit processor, a controller/processor, a memory, or a combination thereof, of the device 100 described above with reference to FIG. 1. In some embodiments, the transmission component 1206 may be co-located with the reception component 1202 such as in a transceiver and/or a transceiver component.

The reactive positioning component 180 may be configured to perform pre-touch/post-touch proximity detection, grasp positioning, and/or contact sensing for reactive positioning. In some embodiments, the reactive positioning component 180 may include a set of components, such as a generating component 1210 configured to generate vibrational energy, a converting component 1220 configured to convert an acoustic reflection of the vibrational energy, a signal processing component 1230 configured to perform signal processing on a voltage signal, a proximity detection component 1240 configured to perform pre-touch/post-touch proximity detection on reflection data, a grasp positioning component 1250 configured to perform grasp positioning on the reflection data, a contact detection component 1260 configured to perform contact detection from the reflection data, and a providing component 1270 configured to providing results to an external device.

In some embodiments, the set of components may be separate and distinct from the reactive positioning component 180. In other embodiments, one or more components of the set of components may include or may be implemented within a controller/processor (e.g., the processor 120), a memory (e.g., the memory 130), or a combination thereof, of the device 100 described above with reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIGS. 1 to 11.

Figure 13:
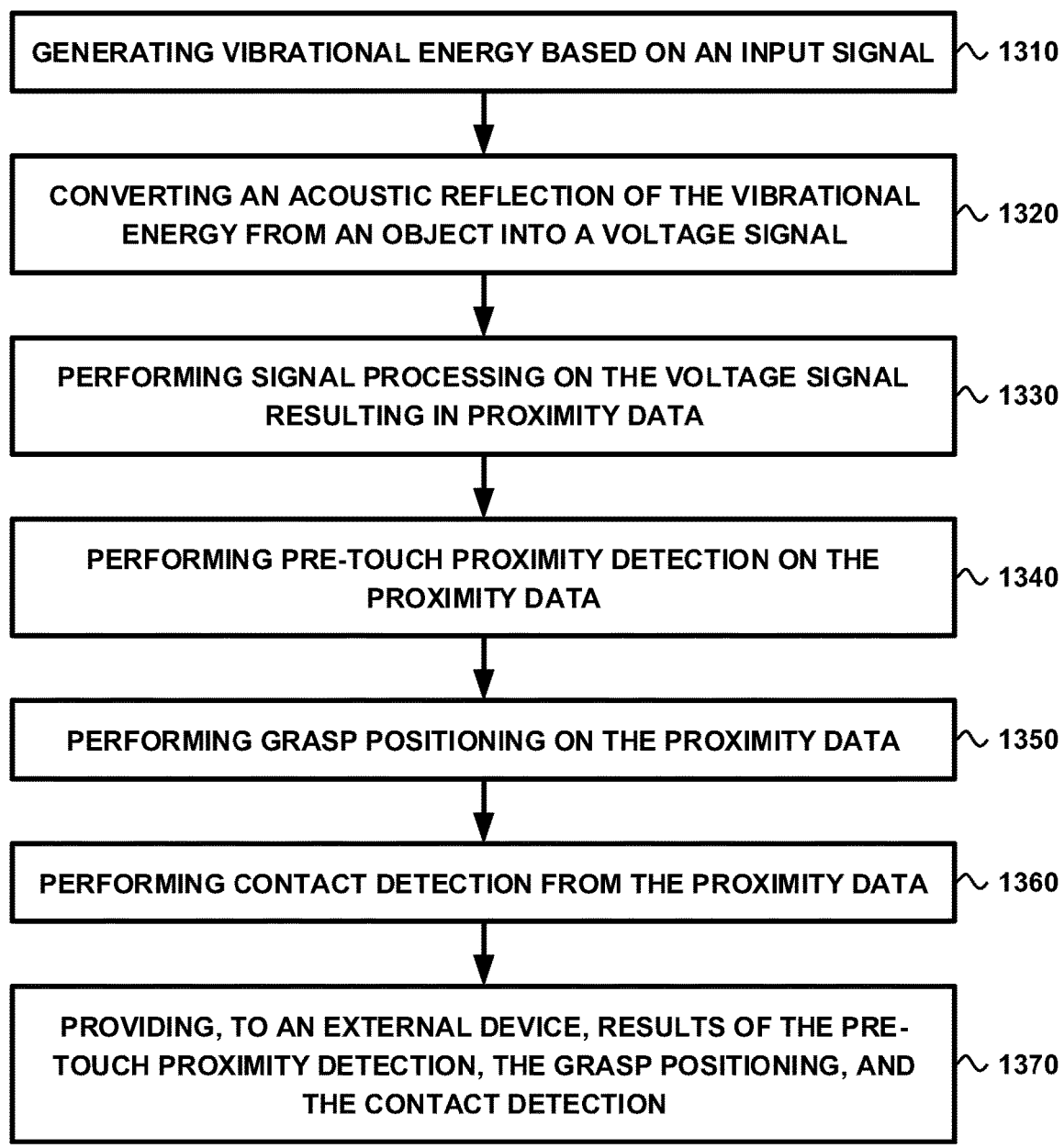
FIG. 13 illustrates a flowchart of an example method of performing reactive positioning by a device, in accordance with various aspects of the present disclosure.

Referring to FIG. 13, in operation, an apparatus 1200 may perform a method 1300 of performing reactive positioning. The method 1300 may be performed by the device 100 (which may include the processor 120, the memory 130, and the storage component 140, and which may be the entire device 100 and/or include one or more components of the device 100, such as the input component 150, the output component 160, the communication interface 170, and/or the reactive positioning component 180) and/or the apparatus 1200. The method 1300 may be performed by the device 100, the apparatus 1200, and/or the reactive positioning component 180 in communication with the apparatus 1208 (e.g., a robotic device, a robot controller, a server, a laptop, a smartphone, a UE, a wearable device, a smart device, an IoT device, and the like).

At block 1310 of FIG. 13, the method 1300 may include generating vibrational energy based on an input signal. For example, in an aspect, the device 100, the reactive positioning component 180, and/or the generating component 1210 may be configured to or may include means for generating vibrational energy (e.g., acoustic aura 227) based on an input signal 315.

For example, the generating at block 1310 may include providing, from the signal processing pipeline 330 to a finger 220 with an embedded transducer 225, a tone signal 315 as an input signal, as described above with reference to FIGS. 2 and 3.

In some embodiments, the generating at block 1310 may include creating vibrations using an acoustic transducer 225 in response to the input signal 315. In optional or additional embodiments, the generating at block 1310 may include producing an acoustic aura 227 by causing the vibrations to transfer to an acoustic transmission media (e.g., a gas, a liquid, a solid) surrounding the finger 220.

Further, for example, the generating at block 1310 may be performed to create an acoustic aura 227 surrounding the finger 220 that may allow the finger 220 to perform the reactive positioning.

At block 1320 of FIG. 13, the method 1300 may include converting an acoustic reflection of the vibrational energy from an object into a voltage signal. For example, in an aspect, the device 100, the reactive positioning component 180, and/or the converting component 1220 may be configured to or may include means for converting an acoustic reflection of the vibrational energy from an object 230 into a voltage signal 333.

For example, the converting at block 1320 may include measuring changes to the effective AC impedance of the transducer 225 that may be caused by acoustic reflections from the object 230 that may be incident on the transducer 225, as described above with reference to FIG. 6A.

In some embodiments, the converting at block 1320 may include receiving the acoustic reflection from the object 230 entering the acoustic aura 227.

In optional or additional embodiments, the converting at block 1320 may include receiving the acoustic reflection from at least one of a top direction, a bottom direction, a front direction, a back direction, and a normal direction.

Further, for example, the converting at block 1320 may be performed to convert the effective impedances changes of the transducer 225 into voltage signals 333 that may be further processed to result in reflection data used to perform the reactive positioning.

At block 1330 of FIG. 13, the method 1300 may include performing signal processing on the voltage signal resulting in reflection data. For example, in an aspect, the device 100, the reactive positioning component 180, and/or the signal processing component 1230 may be configured to or may include means for performing signal processing on the voltage signal 333 resulting in reflection data 338.

For example, the signal processing at block 1330 may include performing at least one of the operations and/or functions of the signal processing pipeline 330 described above with reference to FIG. 3.

In some embodiments, the signal processing at block 1330 may include extracting, from the voltage signal 333, an interference signal comprising a low amplitude signal corresponding to the acoustic reflection.

In optional or additional embodiments, the signal processing at block 1330 may include amplifying the interference signal.

In optional or additional embodiments, the signal processing at block 1330 may include mixing the amplified interference signal with an in-phase copy of the input signal resulting in a proximity signal 335 proportional to undulations of the interference signal.

In optional or additional embodiments, the signal processing at block 1330 may include generating the reflection data 338 by performing an analog-to-digital conversion of a low frequency portion of the proximity 335 signal.

Further, for example, the signal processing at block 1330 may be performed to produce the reflection data 338 used by post-processing algorithms and/or components to perform pre-touch/post-touch proximity detection, grasp positioning, and/or contact sensing for the reactive positioning.

At block 1340 of FIG. 13, the method 1300 may include performing pre-touch proximity detection on the reflection data. For example, in an aspect, the device 100, the reactive positioning component 180, and/or the proximity detection component 1240 may be configured to or may include means for performing pre-touch proximity detection on the reflection data 338.

For example, the pre-touch proximity detection at block 1340 may include performing at least a portion of the proximity detection process 800, as described above with reference to FIG. 8.

In some embodiments, the pre-touch proximity detection at block 1340 may include dividing the reflection data 338 into one or more time windows.

In optional or additional embodiments, the pre-touch proximity detection at block 1340 may include obtaining spectral information from each of the one or more time windows.

In optional or additional embodiments, the pre-touch proximity detection at block 1340 may include combining a portion of the spectral information corresponding to a pre-determined frequency range and obtain a total magnitude of the portion of the spectral information.

In optional or additional embodiments, the pre-touch proximity detection at block 1340 may include comparing the total magnitude with a detection threshold.

Further, for example, the pre-touch proximity detection at block 1340 may be performed to detect objects 230 that have entered the acoustic aura 227 and are in proximity of at least one finger 220.

At block 1350 of FIG. 13, the method 1300 may include performing grasp positioning on the reflection data. For example, in an aspect, the device 100, the reactive positioning component 180, and/or the grasp positioning component 1250 may be configured to or may include means for performing grasp positioning on the reflection data 338.

For example, the grasp positioning at block 1350 may include performing at least a portion of the grasp positioning process, as described above with reference to FIG. 8.

In some embodiments, the grasp positioning at block 1350 may include instructing the end-effector 210 to move along a first direction perpendicular to the object 230.

In optional or additional embodiments, the grasp positioning at block 1350 may include when, based on the reflection data 338, the object 230 has been detected by a first sensor 225, saving a current position of the end-effector 210 as a first position.

In optional or additional embodiments, the grasp positioning at block 1350 may include instructing the end-effector 210 to move in a second direction towards the object 230.

In optional or additional embodiments, the grasp positioning at block 1350 may include when, based on the reflection data 338, the object 230 has been detected by a second sensor 225, saving the current position as a second position.

In optional or additional embodiments, the grasp positioning at block 1350 may include computing a desired grasp position based on the first position and the second position.

Further, for example, the grasp positioning at block 1350 may be performed to position the end-effector 210 in a position with respect to the object 230 that may maximize the probability of a successful grasp by the end-effector 210 of the object 230.

At block 1360 of FIG. 13, the method 1300 may include performing contact detection from the reflection data. For example, in an aspect, the device 100, the reactive positioning component 180, and/or the contact detection component 1260 may be configured to or may include means for performing contact detection from the reflection data 338.

For example, the contact detection at block 1360 may include performing at least a portion of the contact detection process, as described above with reference to FIG. 9.

In some embodiments, the contact detection at block 1360 may include determining whether a signal level change in the reflection data 338 exceeds a contact threshold.

Further, for example, the contact detection at block 1360 may be performed to determine whether the end-effector 210 has successfully grasped the object 230.

In an optional or additional aspect that may be combined with any other aspects, the method 1300 may further include performing a proximity calibration process 1000 as described above with respect to FIG. 10. For example, in an aspect, the device 100, the reactive positioning component 180, and/or the proximity detection component 1240 may be configured to or may include means for performing a proximity calibration process 1000.

In an optional or additional aspect that may be combined with any other aspects, the method 1300 may further include performing a contact calibration process 1100 as described above with respect to FIG. 11. For example, in an aspect, the device 100, the reactive positioning component 180, and/or the contact detection component 1260 may be configured to or may include means for performing a contact calibration process 1100.

The following aspects are illustrative only and aspects thereof may be combined with aspects of other embodiments or teaching described herein, without limitation.

Aspect 1 is an apparatus for performing reactive positioning of a robot gripper. The apparatus includes one or more fingers disposed on an end-effector of the robot, a signal processing circuit, a memory storing instructions, and a processor communicatively coupled to the one or more fingers, the signal processing circuit, and the memory. Each of the one or more fingers includes a transducer configured to generate vibrational energy based on an input signal, and convert an acoustic reflection of the vibrational energy from an object into a voltage signal. The signal processing circuit is configured to provide the input signal to each transducer of the one or more fingers, and perform signal processing on the voltage signal of each transducer of the one or more fingers resulting in reflection data. The processor is configured to execute the instructions to perform pre-touch/post-touch proximity detection on the reflection data, perform grasp positioning on the reflection data, perform contact detection from the reflection data, and provide, to the robot, results of the proximity detection, the grasp positioning, and the contact detection.

In Aspect 2, each finger of the one or more fingers of the apparatus of Aspect 1 may include a flat end surface configured to couple with the end-effector of the robot using a mounting fastener, a first surface including a circular indentation, an acoustic layer disposed in the circular indentation, provided between the first surface and the transducer, and configured to optimize acoustic generation and transmission from the transducer to the first surface, a first foam part disposed on the first surface and the transducer, and a second foam part disposed on a second surface opposite to the first surface.

In Aspect 3, in the apparatus of any of Aspects 1 or 2, the acoustic layer may include an adhesive attaching the transducer to the first surface, and each finger of the one or more fingers may include a sprue that may be disposed in the circular indentation and may be configured to allow excess adhesive of the acoustic layer to flow out of the circular indentation.

In Aspect 4, the transducer of the apparatus of any of Aspects 1 to 3 may be further configured to create vibrations using the transducer in response to the input signal, produce an acoustic aura by causing the vibrations to transfer from the transducer to the finger via the acoustic layer, causing the vibrations to transfer from the finger to the first foam part and the second foam part, and causing the vibrations to transfer from the first foam part and the second foam part to an acoustic transmission media surrounding the first foam part and the second foam part, and receive the acoustic reflection from the object entering the acoustic aura.

In Aspect 5, the transducer of the apparatus of any of Aspects 1 to 4 may be further configured to receive the acoustic reflection from at least one of a top direction, a bottom direction, a front direction, a back direction, and a normal direction.

In Aspect 6, the signal processing circuit of the apparatus of any of Aspects 1 to 5 may be further configured to extract, from the voltage signal, an interference signal including a low amplitude signal corresponding to the acoustic reflection, mix the interference signal with an in-phase copy of the input signal resulting in a proximity signal proportional to undulations of the interference signal, and generate the reflection data by performing an analog-to-digital conversion of a low frequency portion of the proximity signal.

In Aspect 7, the processor of any of Aspects 1 to 6 may be further configured to execute the instructions to divide the reflection data into one or more time windows, obtain spectral information from each of the one or more time windows, combine a portion of the spectral information corresponding to a predetermined frequency range and obtain a total magnitude of the portion of the spectral information, and compare the total magnitude with a detection threshold. In such an aspect, the results of the proximity detection may indicate whether the object has been detected based on the comparison of the total magnitude with the detection threshold.

In Aspect 8, the processor of any of Aspects 1 to 7 may be further configured to execute the instructions to provide the one or more fingers with a calibration signal as the input signal, instruct the end-effector of the robot to approach a calibration object at a predetermined speed, obtain calibration spectral information from calibration reflection data provided by the signal processing circuit based on the calibration signal, and compute the predetermined frequency range and the detection threshold based on the calibration spectral information.

In Aspect 9, the processor of any of Aspects 1 to 8 may be further configured to execute the instructions to instruct the end-effector of the robot to move along an axis perpendicular to the object. In such an aspect, the processor may be further configured to execute the instructions to, when, based on the reflection data, the object has been detected by at least one finger of the one or more fingers, save a current position of the end-effector of the robot as a first position. In such an aspect, the processor may be further configured to execute the instructions to instruct the end-effector of the robot to move at least one other finger opposite to the at least one finger towards the object. In such an aspect, the processor may be further configured to execute the instructions to when, based on the reflection data, the at least one other finger has detected the object, save the current position of the end-effector of the robot as a second position. In such an aspect, the processor may be further configured to execute the instructions to compute a desired grasp position based on the first position and the second position. The results of the grasp positioning may indicate the desired grasp position.

In Aspect 10, the processor of any of Aspects 1 to 9 may be further configured to execute the instructions to determine whether a signal level change in the reflection data exceeds a contact threshold. The results of the contact detection may indicate whether the object has come into contact with at least one of the one or more fingers.

Aspect 11 is a method for performing reactive positioning by an apparatus. The method includes generating vibrational energy based on an input signal, converting an acoustic reflection of the vibrational energy from an object into a voltage signal, performing signal processing on the voltage signal resulting in reflection data, performing pre-touch/post-touch proximity detection on the reflection data, performing grasp positioning on the reflection data, performing contact detection from the reflection data, and providing, to an external device, results of the proximity detection, the grasp positioning, and the contact detection.

In Aspect 12, the method of Aspect 11, may further include creating vibrations using an acoustic transducer in response to the input signal, producing an acoustic aura by causing the vibrations to transfer to an acoustic transmission media surrounding the apparatus, and receiving the acoustic reflection from the object entering the acoustic aura.

In Aspect 13, the method of Aspect 11 or 12, may further include receiving the acoustic reflection from at least one of a top direction, a bottom direction, a front direction, a back direction, and a normal direction.

In Aspect 14, the method of any of Aspects 11 to 13, may further include extracting, from the voltage signal, an interference signal including a low amplitude signal corresponding to the acoustic reflection, mixing the interference signal with an in-phase copy of the input signal resulting in a proximity signal proportional to undulations of the interference signal, and generating the reflection data by performing an analog-to-digital conversion of a low frequency portion of the proximity signal.

In Aspect 15, the method of any of Aspects 11 to 14, may further include dividing the reflection data into one or more time windows, obtaining spectral information from each of the one or more time windows, combining a portion of the spectral information corresponding to a predetermined frequency range and obtain a total magnitude of the portion of the spectral information, and comparing the total magnitude with a detection threshold. The results of the proximity detection may indicate whether the object has been detected based on the comparing of the total magnitude with the detection threshold.

In Aspect 16, the method of any of Aspects 11 to 15, may further include providing a calibration signal as the input signal, approaching a calibration object at a predetermined speed, obtaining calibration spectral information from calibration reflection data based on the calibration signal, and computing the predetermined frequency range and the detection threshold based on the calibration spectral information.

In Aspect 17, the method of any of Aspects 11 to 16, may further include instructing the apparatus to move along a first direction perpendicular to the object. In such an aspect, the method may further include, when, based on the reflection data, the object has been detected by a first sensor, saving a current position as a first position. In such an aspect, the method may further include instructing the apparatus to move in a second direction finger towards the object. In such an aspect, the method may further include, when, based on the reflection data, the object has been detected by a second sensor, saving the current position as a second position. In such an aspect, the method may further include computing a desired grasp position based on the first position and the second position. The results of the grasp positioning may indicate the desired grasp position.

In Aspect 18, the method of any of Aspects 11 to 17, may further include determining whether a signal level change in the reflection data exceeds a contact threshold. The results of the contact detection may indicate whether the object has come into contact with the apparatus.

Aspect 19 is an apparatus for performing reactive positioning of a robot gripper. The apparatus includes one or more fingers disposed on an end-effector of a robot, and a signal processing circuit. Each of the one or more fingers includes a flat end surface configured to couple with the end-effector of the robot using a mounting fastener, a first surface including a circular indentation, a transducer disposed in the circular indentation and configured to generate vibrational energy based on an input signal and convert an acoustic reflection of the vibrational energy from an object into a voltage signal, an acoustic layer disposed in the circular indentation, provided between the first surface and the transducer, and attaching the transducer to the first surface, a sprue disposed in the circular indentation and configured to allow excess adhesive of the acoustic layer to flow out of the circular indentation, a first foam part disposed on the first surface and the transducer, and a second foam part disposed on a second surface opposite to the first surface. The signal processing circuit is configured to provide the input signal to each transducer of the one or more fingers, and perform signal processing on the voltage signal of each transducer of the one or more fingers resulting in reflection data.

In Aspect 20, the apparatus of Aspect 19, may further include a memory storing instructions, and a processor communicatively coupled to the one or more fingers, the signal processing circuit, and the memory. The processor may be configured to execute the instructions to determine, based on the reflection data, whether the object has been detected by at least one of the one or more fingers, compute, based on the reflection data, a desired grasp position of the end-effector of the robot with respect to the robot, and detect, based on a signal level change in the reflection data exceeds a contact threshold, whether the object has come into contact with at least one of the one or more fingers.

Aspect 21 is an apparatus for reactive positioning to be performed by a robot including means for performing one or more of the methods of any of Aspects 11 to 18.

Aspect 22 is a non-transitory computer-readable storage medium storing computer-executable instructions for performing reactive positioning of a robot gripper. The computer-executable instructions are configured, when executed by one or more processors of a robot, to cause the robot to perform one or more of the methods of any of Aspects 11 to 18.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations. Non-transitory computer-readable media may exclude transitory signals.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EEPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLAs) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings (e.g., FIGS. 1, 3, and 5 to 10) may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, and the like, that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which includes one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and the like), and may be used interchangeably with "one or more." Where only one item is intended, the term "one" or similar language is used. Also, as used herein, the terms "has," "have," "having," "includes," "including," or the like are intended to be open-ended terms. Further, the phrase "based on" is intended to mean "based, at least in part, on" unless explicitly stated otherwise. In addition, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment. As used herein, such terms as "1st" and "2nd," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations may be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Furthermore, the described features, advantages, and characteristics of the present disclosure may be combined in any suitable manner in one or more embodiments. One skilled in the relevant art may recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

What is claimed is:

1. An apparatus for performing reactive positioning of a robot gripper, the apparatus comprising:
 one or more fingers disposed on an end-effector of a robot, each of the one or more fingers comprising a transducer configured to:
  generate vibrational energy based on an input signal; and
  convert an acoustic reflection of the vibrational energy from an object into a voltage signal;
 a signal processing circuit configured to:
  provide the input signal to each transducer of the one or more fingers;
  extract, from the voltage signal, an interference signal comprising a low amplitude signal corresponding to the acoustic reflection;
  obtain a proximity signal proportional to undulations of the interference signal by mixing the interference signal with an in-phase copy of the input signal; and
  generate a reflection data by performing an analog-to-digital conversion of a low frequency portion of the proximity signal;
 a memory storing instructions; and
 a processor communicatively coupled to the one or more fingers, the signal processing circuit, and the memory, wherein the processor is configured to execute the instructions to:
  perform pre-touch proximity detection on the reflection data;
  perform grasp positioning on the reflection data;
  perform contact detection from the reflection data; and
  provide, to the robot, results of the pre-touch proximity detection, the grasp positioning, and the contact detection.

2. The apparatus of claim 1, wherein each finger of the one or more fingers comprises:
 a flat end surface configured to couple with the end-effector of the robot using a mounting fastener;
 a first surface comprising a circular indentation;
 an acoustic layer disposed in the circular indentation, provided between the first surface and the transducer, and configured to optimize acoustic generation and transmission from the transducer to the first surface;
 a first foam part disposed on the first surface and the transducer; and
 a second foam part disposed on a second surface opposite to the first surface.

3. The apparatus of claim 2, wherein:
 the acoustic layer comprises an adhesive attaching the transducer to the first surface, and
 each finger of the one or more fingers further comprises a sprue disposed in the circular indentation and configured to allow excess adhesive of the acoustic layer to flow out of the circular indentation.

4. The apparatus of claim 2, wherein the transducer is further configured to:
 create vibrations using the transducer in response to the input signal;
 produce an acoustic aura by causing the vibrations to transfer from the transducer to the finger via the acoustic layer, causing the vibrations to transfer from the finger to the first foam part and the second foam part, and causing the vibrations to transfer from the first foam part and the second foam part to an acoustic transmission media surrounding the first foam part and the second foam part; and
 receive the acoustic reflection from the object entering the acoustic aura.

5. The apparatus of claim 1, wherein the transducer is further configured to:

receive the acoustic reflection from at least one of a top direction, a bottom direction, a front direction, a back direction, and a normal direction.

6. The apparatus of claim 1, wherein to perform the pre-touch proximity detection comprises to:
divide the reflection data into one or more time windows;
obtain spectral information from each of the one or more time windows;
combine a portion of the spectral information corresponding to a predetermined frequency range and obtain a total magnitude of the portion of the spectral information; and
compare the total magnitude with a detection threshold,
wherein the results of the pre-touch proximity detection indicate whether the object has been detected based on the comparison of the total magnitude with the detection threshold.

7. The apparatus of claim 6, wherein the processor is further configured to execute the instructions to:
provide the one or more fingers with a calibration signal as the input signal;
instruct the end-effector of the robot to approach a calibration object at a predetermined speed;
obtain calibration spectral information from calibration reflection data provided by the signal processing circuit based on the calibration signal; and
compute the predetermined frequency range and the detection threshold based on the calibration spectral information.

8. The apparatus of claim 1, wherein to perform the grasp positioning comprises to:
instruct the end-effector of the robot to move along an axis perpendicular to the object;
when, based on the reflection data, the object has been detected by at least one finger of the one or more fingers, save a current position of the end-effector of the robot as a first position;
instruct the end-effector of the robot to move at least one other finger opposite to the at least one finger towards the object;
when, based on the reflection data, the at least one other finger has detected the object, save the current position of the end-effector of the robot as a second position; and
compute a desired grasp position based on the first position and the second position,
wherein the results of the grasp positioning indicate the desired grasp position.

9. The apparatus of claim 1, wherein to perform the contact detection comprises to:
determine whether a signal level change in the reflection data exceeds a contact threshold,
wherein the results of the contact detection indicate whether the object has come into contact with at least one of the one or more fingers.

10. A method for performing reactive positioning by an apparatus, comprising:
generating vibrational energy based on an input signal;
converting an acoustic reflection of the vibrational energy from an object into a voltage signal;
extracting, from the voltage signal, an interference signal comprising a low amplitude signal corresponding to the acoustic reflection;
obtaining a proximity signal proportional to undulations of the interference signal by mixing the interference signal with an in-phase copy of the input signal;
generating a reflection data by performing an analog-to-digital conversion of a low frequency portion of the proximity signal;
performing pre-touch proximity detection on the reflection data;
performing grasp positioning on the reflection data;
performing contact detection from the reflection data; and
providing, to an external device, results of the pre-touch proximity detection, the grasp positioning, and the contact detection.

11. The method of claim 10, wherein:
the generating of the vibrational energy comprises:
creating vibrations using an acoustic transducer in response to the input signal; and
producing an acoustic aura by causing the vibrations to transfer to an acoustic transmission media surrounding the apparatus, and
the converting of the acoustic reflection comprises:
receiving the acoustic reflection from the object entering the acoustic aura.

12. The method of claim 11, wherein the receiving of the acoustic reflection from the object comprises:
receiving the acoustic reflection from at least one of a top direction, a bottom direction, a front direction, a back direction, and a normal direction.

13. The method of claim 10, wherein the performing of the pre-touch proximity detection comprises:
dividing the reflection data into one or more time windows;
obtaining spectral information from each of the one or more time windows;
combining a portion of the spectral information corresponding to a predetermined frequency range and obtain a total magnitude of the portion of the spectral information; and
comparing the total magnitude with a detection threshold,
wherein the results of the pre-touch proximity detection indicate whether the object has been detected based on the comparing of the total magnitude with the detection threshold.

14. The method of claim 13, further comprising:
providing a calibration signal as the input signal;
approaching a calibration object at a predetermined speed;
obtaining calibration spectral information from calibration reflection data based on the calibration signal; and
computing the predetermined frequency range and the detection threshold based on the calibration spectral information.

15. The method of claim 10, wherein the performing of the grasp positioning comprises:
instructing the apparatus to move along a first direction perpendicular to the object;
when, based on the reflection data, the object has been detected by a first sensor, saving a current position as a first position;
instructing the apparatus to move in a second direction finger towards the object;
when, based on the reflection data, the object has been detected by a second sensor, saving the current position as a second position; and
computing a desired grasp position based on the first position and the second position,
wherein the results of the grasp positioning indicate the desired grasp position.

16. The method of claim 10, wherein the performing of the contact detection comprises:

determining whether a signal level change in the reflection data exceeds a contact threshold,
wherein the results of the contact detection indicate whether the object has come into contact with the apparatus.

17. An apparatus for performing reactive positioning of a robot gripper, comprising:
one or more fingers disposed on an end-effector of a robot, each of the one or more fingers comprising:
a flat end surface configured to couple with the end-effector of the robot using a mounting fastener;
a first surface comprising a circular indentation;
a transducer disposed in the circular indentation and configured to:
generate vibrational energy based on an input signal; and
convert an acoustic reflection of the vibrational energy from an object into a voltage signal;
an acoustic layer disposed in the circular indentation, provided between the first surface and the transducer, and attaching the transducer to the first surface;
a sprue disposed in the circular indentation and configured to allow excess adhesive of the acoustic layer to flow out of the circular indentation;
a first foam part disposed on the first surface and the transducer; and
a second foam part disposed on a second surface opposite to the first surface; and
a signal processing circuit configured to:
provide the input signal to each transducer of the one or more fingers; and
perform signal processing on the voltage signal of each transducer of the one or more fingers resulting in reflection data.

18. The apparatus of claim 17, further comprising:
a memory storing instructions; and
a processor communicatively coupled to the one or more fingers, the signal processing circuit, and the memory, wherein the processor is configured to execute the instructions to:
determine, based on the reflection data, whether the object has been detected by at least one of the one or more fingers;
compute, based on the reflection data, a desired grasp position of the end-effector of the robot with respect to the robot; and
detect, based on a signal level change in the reflection data exceeds a contact threshold, whether the object has come into contact with at least one of the one or more fingers.

* * * * *